United States Patent
Al Hajri et al.

(10) Patent No.: US 10,462,303 B2
(45) Date of Patent: Oct. 29, 2019

(54) SURROGATE CELLULARLESS ROAMING

(71) Applicants: Mohammed Hamad Al Hajri, Doha (QA); Karim Mahjoubi, Sfax (TN)

(72) Inventors: Mohammed Hamad Al Hajri, Doha (QA); Fehmi Elbare, Sfax (TN); Karim Mahjoubi, Sfax (TN)

(73) Assignee: MOHAMMED HAMAD AL HAJRI, Doha (QA)

( * ) Notice: Subject to any disclaimer, the term of this patent is extended or adjusted under 35 U.S.C. 154(b) by 0 days.

(21) Appl. No.: 15/510,494

(22) PCT Filed: Oct. 12, 2016

(86) PCT No.: PCT/IB2016/056111
§ 371 (c)(1),
(2) Date: Mar. 10, 2017

(87) PCT Pub. No.: WO2018/069748
PCT Pub. Date: Apr. 19, 2018

(65) Prior Publication Data
US 2019/0230224 A1 Jul. 25, 2019

(51) Int. Cl.
*H04M 3/58* (2006.01)
*H04W 4/00* (2018.01)
(Continued)

(52) U.S. Cl.
CPC .......... *H04M 3/58* (2013.01); *H04L 65/1006* (2013.01); *H04L 65/1069* (2013.01);
(Continued)

(58) Field of Classification Search
CPC ..... H04W 12/06; H04W 12/02; H04W 12/08; H04W 8/183; H04W 8/205; H04W 4/24;
(Continued)

(56) References Cited

U.S. PATENT DOCUMENTS

2005/0015434 A1 1/2005 He
2005/0186960 A1* 8/2005 Jiang ................. H04L 29/06027
455/435.1

(Continued)

OTHER PUBLICATIONS

GoIP User Manual by DBL Technology Co., Ltd, dated Jun. 24, 2016 (Year: 2016).*

(Continued)

*Primary Examiner* — Daniel Lai
(74) *Attorney, Agent, or Firm* — Ward and Smith, P.A.; Ryan K. Simmons

(57) ABSTRACT

Cellularless roaming avoids excess charges in private cellular network. A user swaps a subscriber identity module from a mobile device and into a surrogate cellular device. The surrogate cellular device may then use the subscriber identity module to establish wireless communication in a home location of a private cellular network. The surrogate cellular device, though, may still communicate with the mobile device using the public Internet. Whenever the surrogate cellular device receives a cellular call or data, the cellular call or data may be routed via the public Internet to the mobile device. The user may thus carry the mobile device to any country in the world and avoid roaming charges.

20 Claims, 37 Drawing Sheets

(51) Int. Cl.
 *H04W 4/16* (2009.01)
 *H04L 29/06* (2006.01)
 *H04M 7/12* (2006.01)
(52) U.S. Cl.
 CPC ........ *H04L 65/1073* (2013.01); *H04M 7/125* (2013.01); *H04M 7/1235* (2013.01); *H04W 4/00* (2013.01); *H04W 4/16* (2013.01)
(58) Field of Classification Search
 CPC . H04W 76/10; H04W 12/0023; H04W 88/02; H04W 88/06; H04W 8/24; H04W 12/00512; H04W 4/60; H04W 76/11; H04W 84/12; H04W 48/18; H04W 8/18; H04W 12/00514; H04W 12/0013; H04W 24/04; H04W 36/14; H04W 4/00; H04W 4/12; H04W 88/04; H04W 8/06; H04W 8/20; H04M 3/58; H04M 7/1235; H04M 7/125; H04L 65/1073; H04L 65/1006; H04L 65/1069
 See application file for complete search history.

(56) References Cited

U.S. PATENT DOCUMENTS

| | | | |
|---|---|---|---|
| 2006/0114883 A1* | 6/2006 | Mehta | H04W 80/04 370/352 |
| 2006/0205436 A1 | 9/2006 | Liu et al. | |
| 2006/0293038 A1* | 12/2006 | Walter | H04W 76/10 455/418 |
| 2007/0042791 A1* | 2/2007 | Walter | H04M 3/42374 455/461 |
| 2008/0039079 A1 | 2/2008 | Iyer et al. | |
| 2010/0122337 A1 | 5/2010 | Liu et al. | |
| 2012/0150742 A1 | 6/2012 | Poon et al. | |

OTHER PUBLICATIONS

International Search Report and Written Opinion of International Application No. PCT/IB2016/056111, dated Jan. 19, 2017.

* cited by examiner

SURROGATE CELLULARLESS ROAMING

RELATED APPLICATIONS

This application is a 35 U.S.C. § 371 U.S. national phase entry of International Application No. PCT/IB2016/056111 having an international filing date of Oct. 12, 2016, the application of which is incorporated herein by reference in its entirety.

BACKGROUND

Cellular roaming is challenging. Even though cellular service providers currently offer roaming services, charges are incurred at high per-minute rates. A user may also roam by purchasing a new smartphone or by swapping to a different SIM card. However, the user's cellular number changes, and the user's profile (e.g., contacts and text messages) is lost.

SUMMARY

In one embodiment a method is provided, including, establishing, by a surrogate cellular device, radio communication with a cellular base station associated with a home location in a private cellular network, the radio communication specifying a cellular identifier associated with a subscriber identity module installed in the surrogate cellular device; converting, by the surrogate cellular device, the radio communication into messages utilizing an Internet protocol; determining, by the surrogate cellular device, an Internet protocol address associated with a SIMless mobile device, the SIMless mobile device having the subscriber identity module removed therefrom and installed in the surrogate cellular device; and sending, by the surrogate cellular device, the messages via the public Internet to the SIMless mobile device associated with the Internet protocol address, the messages providing cellularless roaming outside the home location in the private cellular network. The method may further include registering the surrogate cellular device with the cellular base station. The method may further include registering the surrogate cellular device with the private cellular network. The method may further include using a session initiation protocol to convert the radio communication into the messages utilizing the Internet protocol. The method may further include querying an electronic database for a network address associated with the surrogate cellular device having the subscriber identity module installed therein; and retrieving the Internet protocol address associated with the SIMless mobile device having the subscriber identity module removed therefrom, the Internet protocol address electronically associated with the network address associated with the surrogate cellular device. The method may further include receiving at least one of a short messaging service text message and a multi-media messaging service message from the cellular base station. The method may further include receiving a cellular call from the cellular base station.

In another embodiment, a system is provided, including a hardware processor; and a memory device, the memory device storing instructions, the instructions when executed causing the processor to perform operations, the operations may include, receiving messages sent via the Internet from a surrogate cellular device, the messages utilizing an Internet protocol and converted from radio communications with a cellular base station associated with a home location in a private cellular network, the messages specifying a cellular identifier associated with a subscriber identity module installed in the surrogate cellular device; determining an Internet protocol address associated with a SIMless mobile device, the SIMless mobile device having the subscriber identity module removed therefrom and installed in the surrogate cellular device; and sending the messages via the public Internet to the SIMless mobile device associated with the Internet protocol address, the messages sent for cellularless roaming outside the home location in the private cellular network. The operations may further include registering the surrogate cellular device. The operations may further include registering the SIMless mobile device. The operations may further include receiving the messages formatted according to a session initiation protocol. The operations may further include, querying an electronic database for the cellular identifier specified in the messages; and retrieving the Internet protocol address associated with the SIMless mobile device having the subscriber identity module removed therefrom, the Internet protocol address electronically associated with the cellular identifier specified in the messages. The operations may further include receiving the messages converted from at least one of a short messaging service text message and a multi-media messaging service message. The operations may further include receiving the messages converted from a cellular call.

In yet another embodiment a memory device is provided, wherein the memory device storing instructions that when executed cause a processor to perform operations. The operations may include receiving messages sent via the Internet from a surrogate cellular device, the messages utilizing an Internet protocol and converted from radio communications with a cellular base station associated with a home location in a private cellular network, the messages specifying a cellular identifier associated with a subscriber identity module installed in the surrogate cellular device; performing a cloud-based service that provides routing information for cellularless roaming, the cloud-based service determining an Internet protocol address associated with a SIMless mobile device, the SIMless mobile device having the subscriber identity module removed therefrom and installed in the surrogate cellular device; and sending the messages via the public Internet in response to the cloud-based service, the messages sent to the SIMless mobile device associated with the Internet protocol address, the messages allowing the cellularless roaming outside the home location in the private cellular network. The operations may further include registering the surrogate cellular device. The operations may further include registering the SIMless mobile device. The operations may further include receiving the messages formatted according to a session initiation protocol. The operations may further include, querying an electronic database for the cellular identifier specified in the messages; and retrieving the Internet protocol address associated with the SIMless mobile device having the subscriber identity module removed therefrom, the Internet protocol address electronically associated with the cellular identifier specified in the messages. The operations may further include receiving the messages converted from at least one of a short messaging service text message, a multi-media messaging service message, and a cellular call.

BRIEF DESCRIPTION OF THE DRAWINGS

The presently disclosed subject matter will be described with reference to the accompanying Drawings, which are not necessarily drawn to scale, and wherein.

DETAILED DESCRIPTION

Figure 1:
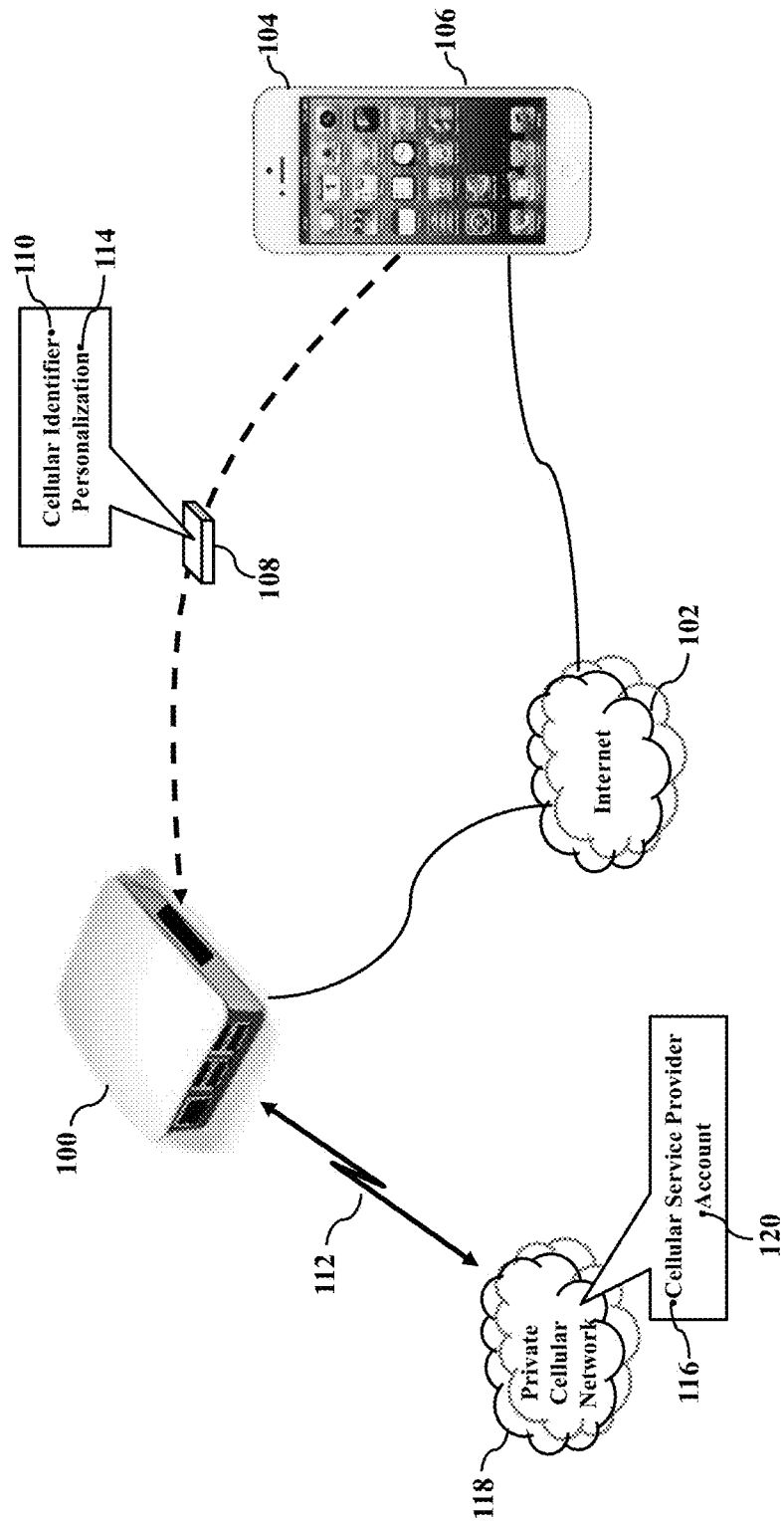
FIGS. 1-7 are simplified illustrations of an environment in which exemplary embodiments may be implemented.

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the exemplary embodiments set forth herein; rather, these exemplary embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the Detailed Description and the associated Drawings. Therefore, it is to be understood that the presently disclosed subject matter is not to be limited to the specific exemplary embodiments disclosed and that modifications and other embodiments are intended to be included within the scope of the appended claims.

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

FIGS. 1-7 are simplified illustrations of an environment in which exemplary embodiments may be implemented. FIG. 1 illustrates a surrogate cellular device 100 that establishes communication via the Internet 102 with a mobile device 104. FIG. 1 illustrates the mobile device 104 as a smartphone 106, which most readers are assumed familiar. The mobile device 104, though, may be any processor-controlled device, as later paragraphs will explain. Regardless, when a user of the smartphone 106 desires or requires roaming (domestic or international), the user inserts her subscriber identity module (or "SIM" card) 108 into the surrogate cellular device 100. As the reader likely understands, the subscriber identity module 108 electronically stores one or more cellular identifiers 110 that are required for a cellular service 112. Moreover, the subscriber identity module 108 may also store personalization information 114 (such as contacts, settings, and historical messages). The user thus removes her subscriber identity module 108 from the smartphone 106 and inserts the subscriber identity module 108 into the surrogate cellular device 100. The user, in plain words, swaps the subscriber identity module 108 from her smartphone 106 to the surrogate cellular device 100. The surrogate cellular device 100 thus uses the subscriber identity module 108 to register for the cellular service 112 with a cellular service provider 116 operating a private cellular network 118. The surrogate cellular device 100 thus assumes an account 120 associated with the cellular identifier 110.

Figure 2:
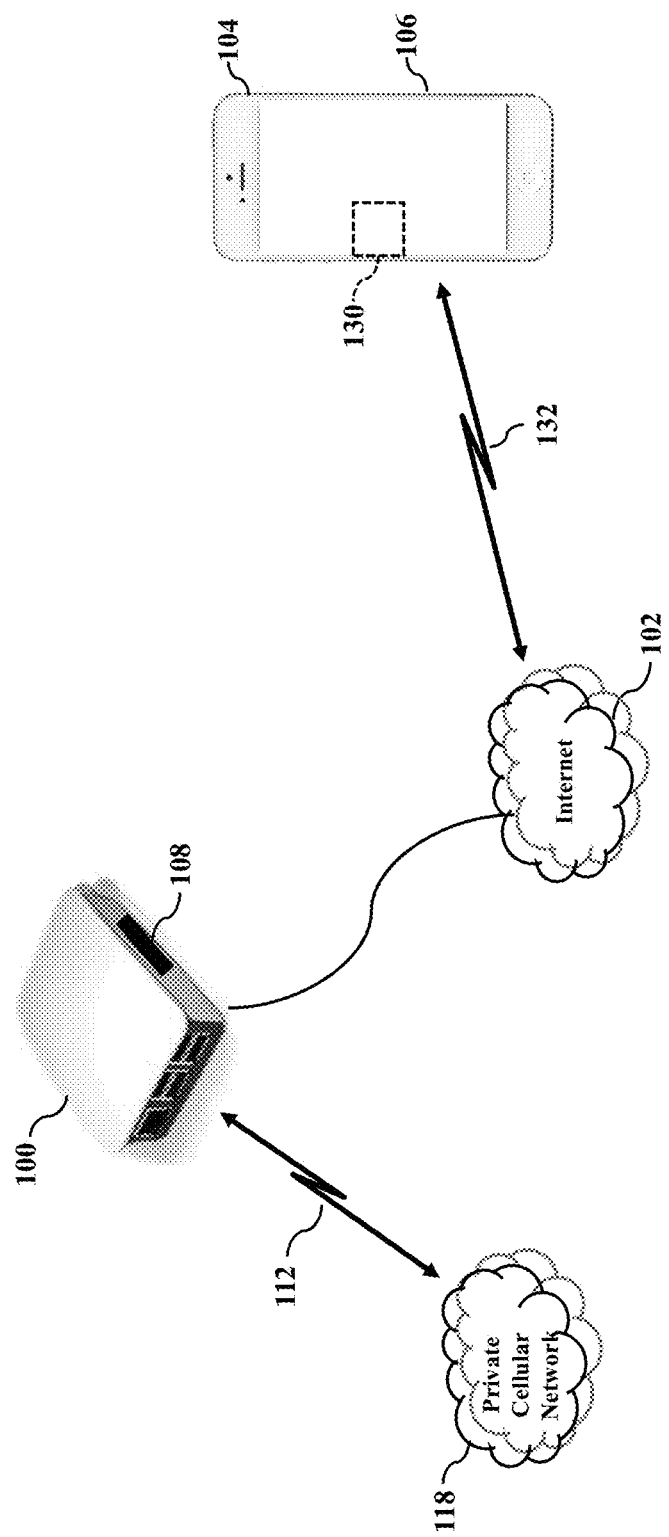

FIG. 2 illustrates additional network connectivity. Once the surrogate cellular device 100 registers for the cellular service 112, the user's smartphone 106 may still ingeniously roam with greatly reduced costs. Even though the subscriber identity module 108 has been removed from the smartphone 106, the smartphone 106 still has other networking capabilities. That is, even though the smartphone 106 is "SIMless" (illustrated as reference numeral 130), the smartphone 106 may still communicate with the surrogate cellular device 100 using non-radio, public spectrum. For example, most readers are thought familiar with wireless local area networking (or "WI-FI") 132 available in many homes and businesses. The SIMless smartphone 106 may also use BLUETOOTH® and/or any other non-cellular communications technology to establish communication with the surrogate cellular device 100. Regardless, even though the subscriber identity module 108 has been removed from the smartphone 106, the SIMless smartphone 106 still has other communications capabilities. The user may thus carry her SIMless smartphone 106 and still communicate via the Internet 102 with the surrogate cellular device 100.

Figure 3:
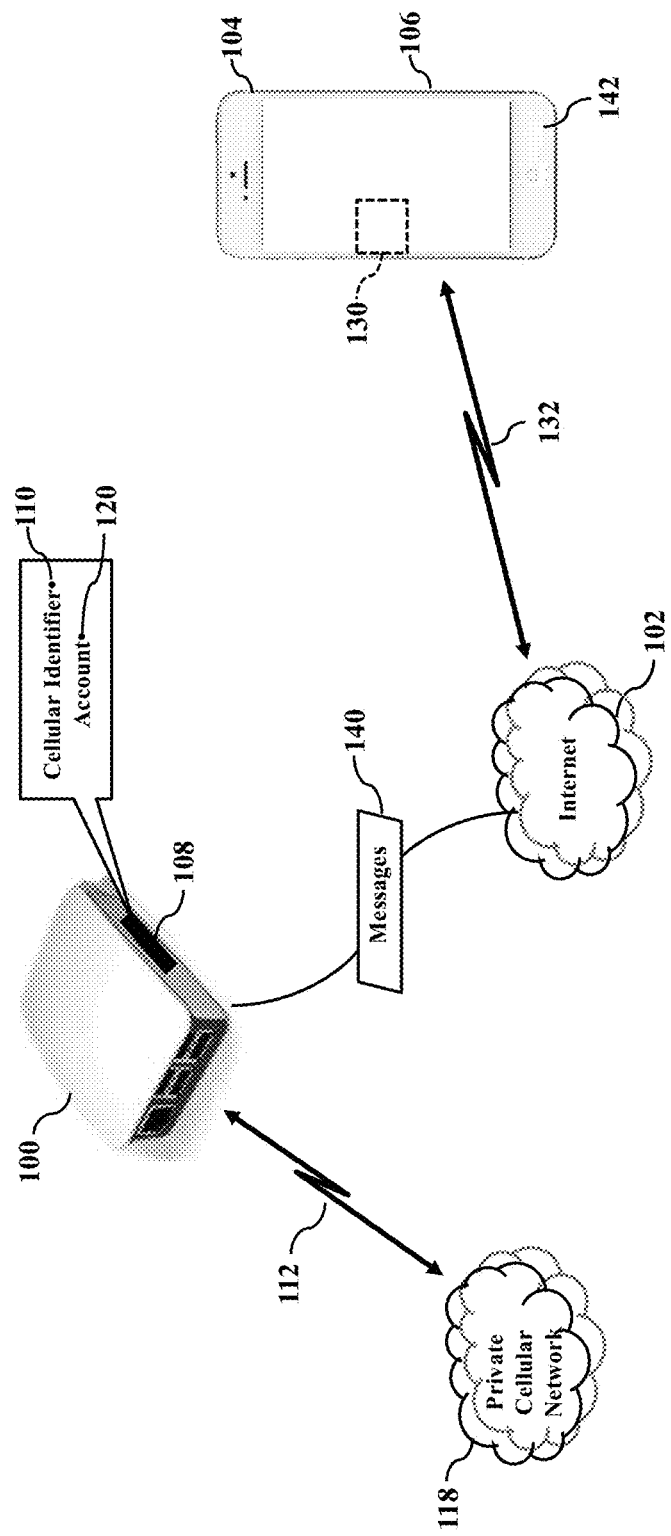

FIG. 3 illustrates Internet messaging. Once the user's SIMless smartphone 106 connects to the public Internet 102, cellularless roaming may be established. Whenever the surrogate cellular device 100 receives a cellular call or cellular data (using the account 120 associated with the subscriber identity module 108), the surrogate cellular device 100 may convert the cellular call or data into one or more messages 140. The messages 140 may be formatted for the public Internet 102 (as later paragraphs will explain). The surrogate cellular device 100 may then send the messages 140 into the public Internet 102 for routing and delivery to a network address 142 (e.g., an Internet protocol address) associated with the user's SIMless smartphone 106. When the SIMless smartphone 106 receives the messages 140, the SIMless smartphone 106 processes and/or converts the messages 140 into the call or data (again, as later paragraphs will explain). The user may even speak or type her response, which the SIMless smartphone 106 converts into the messages 140 that are sent back into the Internet 102 for routing and delivery to the surrogate cellular device 100. This back-and-forth exchange of the messages 140 proceeds until the call or data stops or terminates.

Figure 4:
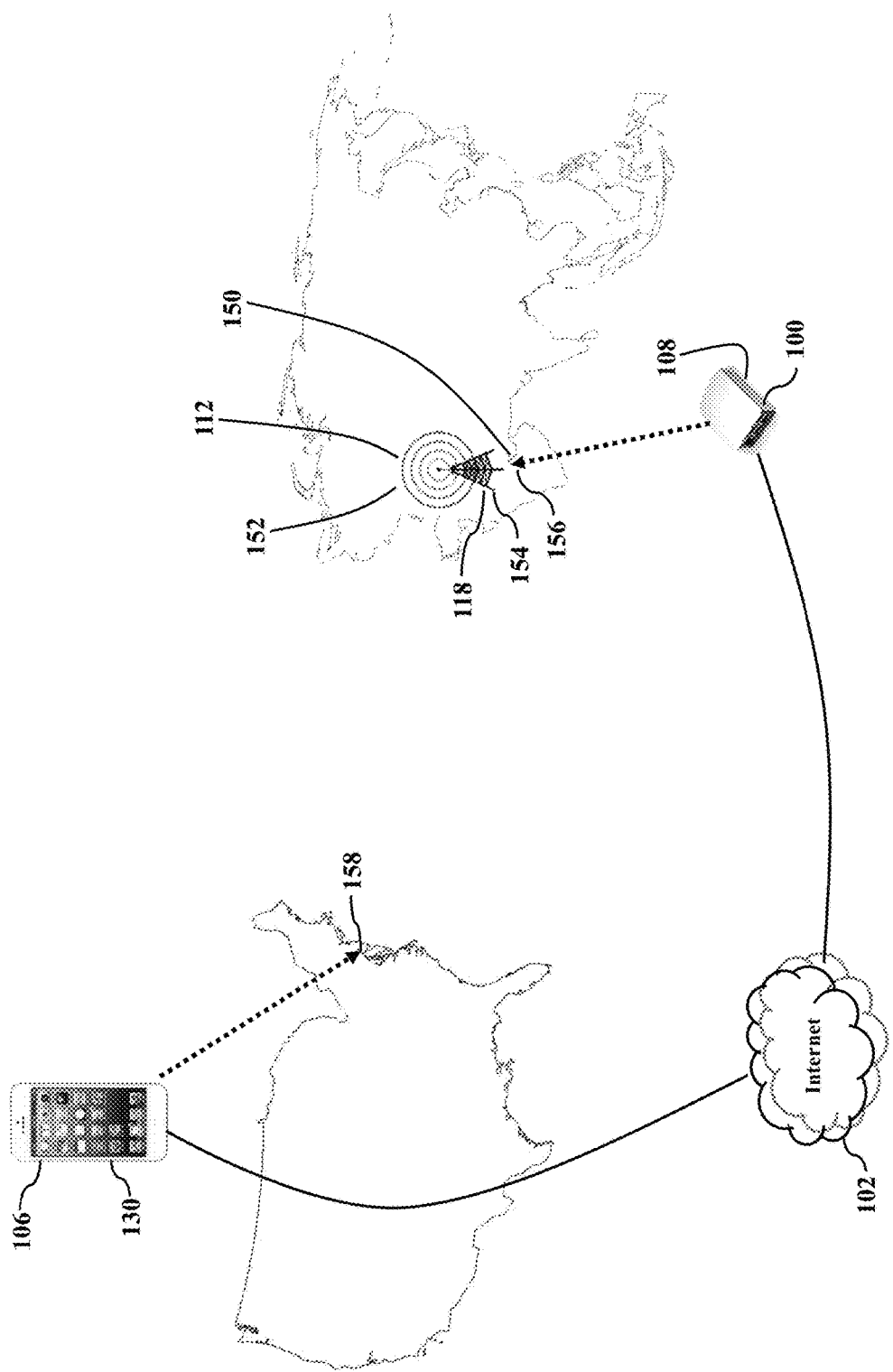
Figure 5:
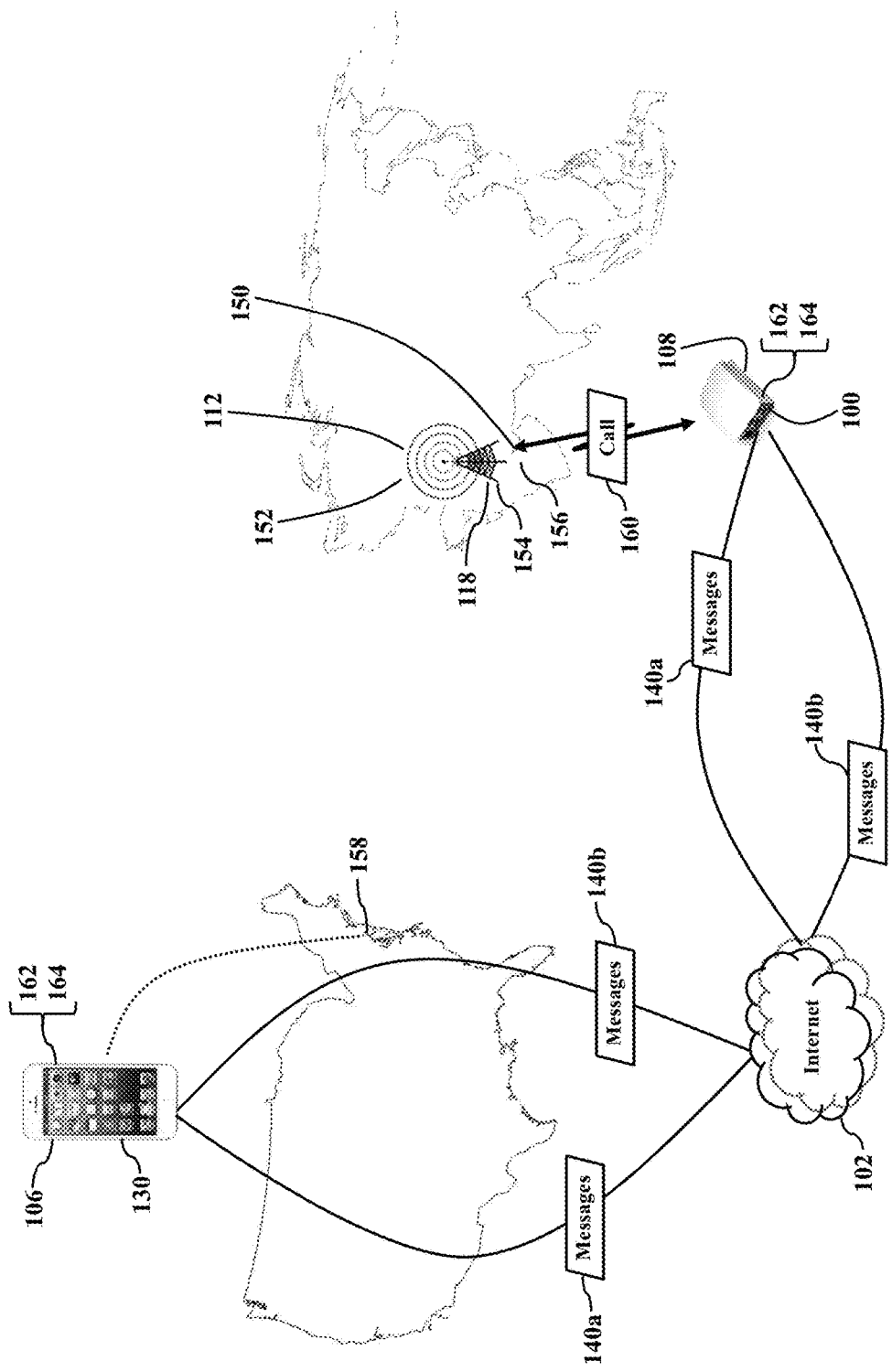

FIGS. 4-5 illustrate the eloquence of cellularless roaming. Suppose the user installs the surrogate cellular device 100 in her home in Qatar (illustrated as reference numeral 150). That is, the surrogate cellular device 100 is stationary and uses the subscriber identity module 108 to establish radio communications 152 with a cellular base station 154 known to be a home location 156 in the private cellular network 118. The user, though, carries her SIMless smartphone 106 during travels to New York City (illustrated as reference numeral 158). When the SIMless smartphone 106 connects to the Internet 102 (perhaps using WI-FI® or other publically-available spectrum), the surrogate cellular device 100 and the user's SIMless smartphone 106 may still establish communication via the public Internet 102.

As FIG. 5 illustrates, cellularless roaming may commence. Even though the SIMless smartphone 106 is unconnected and unregistered with the private cellular network 118, the SIMless smartphone 106 may still utilize the cellular service 112 provided by the cellular base station 154 in the private cellular network 118. For example, when the surrogate cellular device 100 receives a cellular call 160 in the home location 156 of Qatar 150, exemplary embodiments allow the SIMless smartphone 106 to receive the cellular call 160 in New York City 158 without incurring roaming charges. The surrogate cellular device 100 converts the cellular call 160 into the messages 140a for the Internet realm. Exemplary embodiments, for example, may use Voice over Internet Protocol (or "VoIP") technology 162 and/or Session Initiation Protocol (or "SIP") 164 to convert the cellular call 160. The messages 140a are then sent via the public Internet 102 to the user's SIMless smartphone 106 located in New York City 158. The user speaks her response, which the SIMless smartphone 106 converts into the messages 140b that are sent via the Internet 102 to the surrogate cellular device 100 physically located in Qatar 150. The surrogate cellular device 100 may then process the messages 140b for radio transmission back to the cellular base station 154 in the user's home location 156. The private cellular network 118 thus logs the cellular call 160 as exclusively utilizing the cellular base station 154 in the user's home location 156 (e.g., Qatar 150), but the user's SIMless smartphone 106 was physically located thousands of miles away in New York City 158. Exemplary embodiments thus avoid using networking elements (such as other cellular base stations) operating outside the user's home location 156 in the private cellular network 118. The cellular network 118, in plain words, registers no need for roaming service, even though the SIMless smartphone 106 operates in New York City 158.

Figure 6:
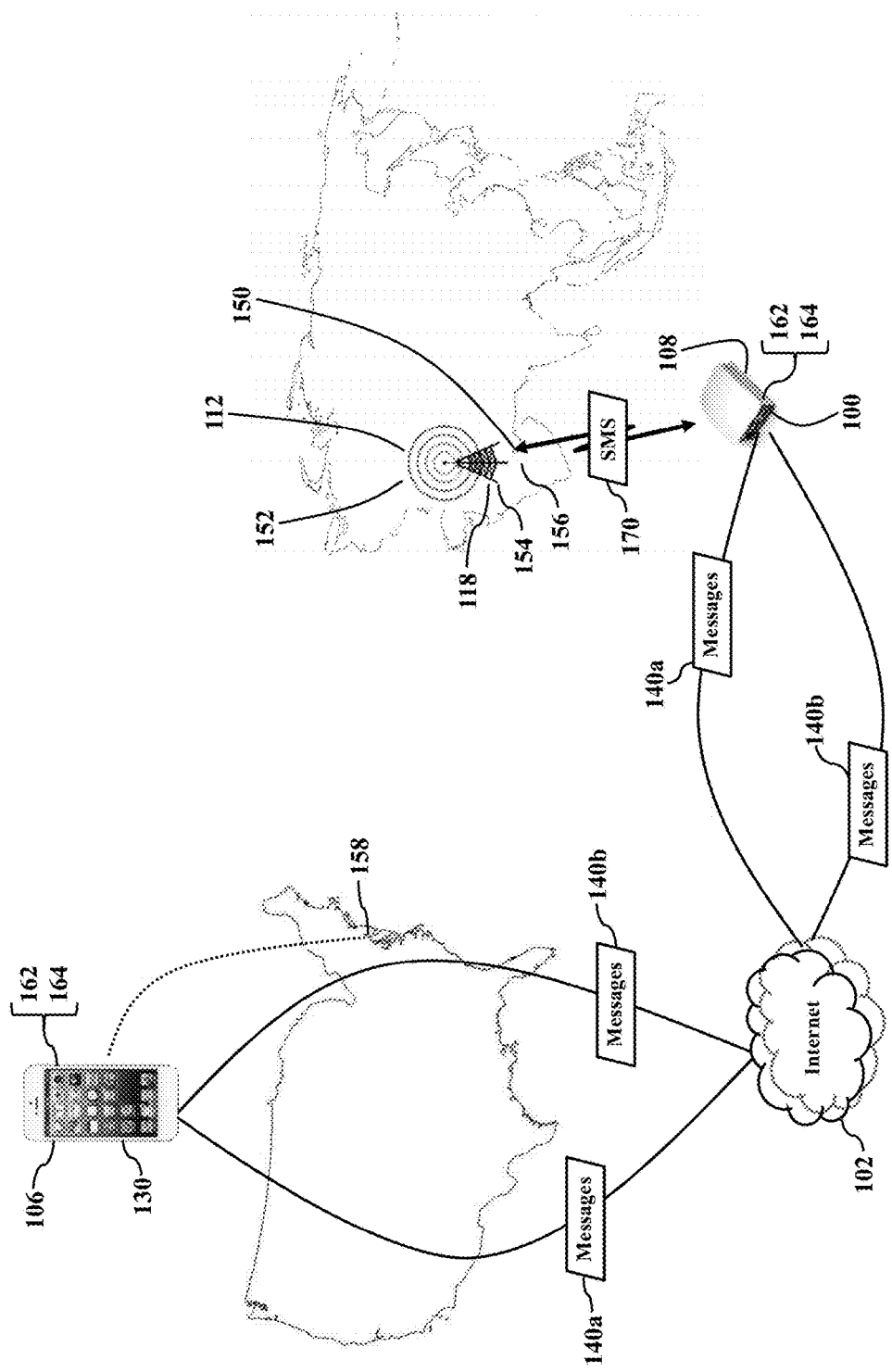

FIG. 6 illustrates a similar scenario for text messaging. Here exemplary embodiments may be applied to Short Messaging Service (SMS) text messages. When the surrogate cellular device 100 receives an SMS text message 170 via the cellular network 118, the surrogate cellular device 100 may convert the SMS text message 170 into the Internet messages 140a for routing via the public Internet 102 to the user's SIMless smartphone 106 in New York City 158. The SIMless smartphone 106 thus processes the Internet messages 140a for display, thus allowing the user to read the corresponding text. If the user wishes to send a textual reply, the SIMless smartphone 106 converts the user's text into the messages 140b that are routed via the Internet 102 back to the surrogate cellular device 100 in Qatar 150. The surrogate cellular device 100 may then convert the messages 140b into one or more reply SMS text messages 170 for radio transmission back to the cellular base station 154 in the private cellular network 118.

Figure 7:
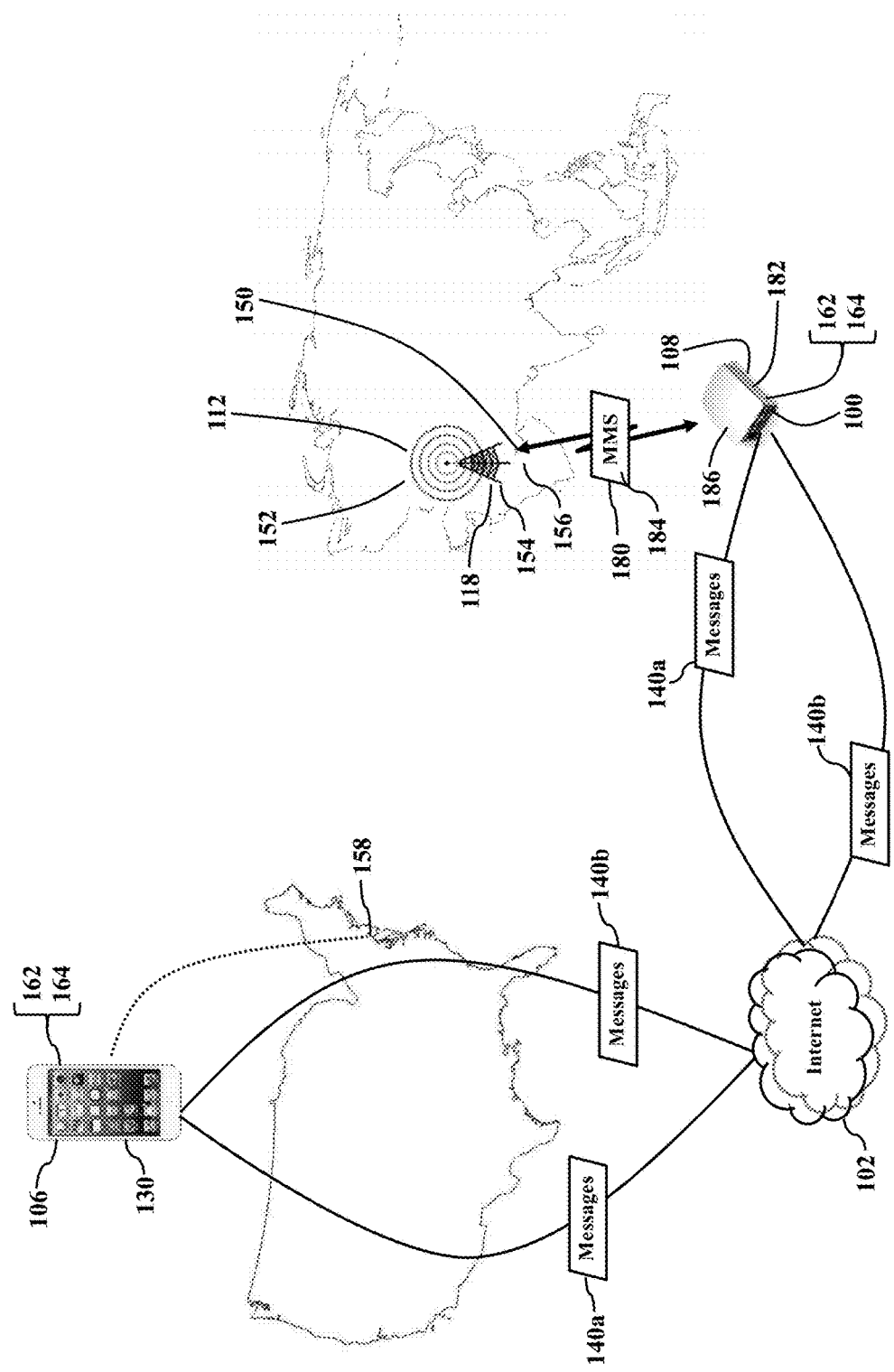

FIG. 7 illustrates multi-media messaging. Here exemplary embodiments may be applied to cellular data containing images, video, and/or text. Suppose the surrogate cellular device 100 (physically located in Qatar 150) receives a multi-media messaging service ("MMS") message 180 via the private cellular network 118. As the reader may understand, the MMS message 180 may reference electronic content 182. For example, the MMS message 180 may specify a uniform resource locator (or "URL") 184. The surrogate cellular device 100 may thus retrieve the electronic content 182 that corresponds to the URL 184. The surrogate cellular device 100, for example, may call a browser application 186 to query a content server (not shown for simplicity). Once the surrogate cellular device 100 retrieves the electronic content 182 (such as a webpage), the surrogate cellular device 100 may convert the MMS message 180, the corresponding electronic content 182, and/or the URL 184 into the Internet messages 140a (perhaps using the VoIP technology 162 and/or the SIP 164). The surrogate cellular device 100 may then send the messages 140a via the public Internet 102 to the user's SIMless smartphone 106 (again, perhaps located in New York City 158). The SIMless smartphone 106 processes the Internet messages 140a for display, thus allowing the user to view the electronic content 182. The user, of course, may also send a reply MMS message, which the SIMless smartphone 106 converts into the one or more Internet messages 140b that are sent via the Internet 102 back to the surrogate cellular device 100 (in Qatar 150). The surrogate cellular device 100 may then convert the Internet messages 140b into one or more reply MMS messages 180 for radio transmission back into the private cellular network 118.

As FIGS. 4-7 illustrate, exemplary embodiments create a surrogate network presence. Even though the user's SIMless smartphone 106 is located in New York City 158, the reader may notice how exemplary embodiments exclusively utilized the single cellular base station 154 local to the user's home location 156 (e.g., Qatar 150). The private cellular network 118, in plain words, processed the cellular call 160, the SMS text message 170, and the MMS message 180 without charging fees for international roaming. The surrogate cellular device 100 may thus functionally operate as a proxy, enabling the SIMless smartphone 106 to utilize the cellular service 112 without registration or use of the private cellular infrastructure. The SIMless smartphone 106 may thus roam the world using the public Internet 102 while receiving the cellular services 112 provided by the single cellular base station 154 in the user's home location 156.

Exemplary embodiments thus present an ingenious and inexpensive solution. The surrogate cellular device 100 establishes a stationary, static network presence with the private cellular network 118. If the surrogate cellular device 100 establishes the cellular service 112 in the user's home location 156, intelligence in the private cellular network 118 will repeatedly log the cellular base station 154 as the home location 156 (and even global positioning system information that corresponds to the home location 156) for each network transaction with the surrogate cellular device 100. The user account 120 will thus also log local usage, regardless of the actual physical location of the user's SIMless smartphone 106. No roaming costs are incurred, and any access charges for use of the public Internet 102 are comparatively minimal.

Exemplary embodiments also present an elegant solution for international roaming. Cellular roaming occurs when the subscriber identity module 108 is associated with base stations outside the home location 156. Competitive pressure has forced some cellular service providers to enlarge the home location 156 to encompass regional or even nationwide service. International usage, though, is still subject to excess charges. That is, when the subscriber identity module 108 is associated with base stations having identifiers associated with foreign countries, cellular service providers charge added fees. Exemplary embodiments, though, maintain the home location 156 despite the actual, physical location of the user's SIMless smartphone 106. The user may roam the world and rely on the public Internet, all the while maintaining usage of her subscriber identity module 108, her cellular telephone number, and her personalization settings. Exemplary embodiments thus permit world-wide use of the SIMless smartphone 106, using the same cellular telephone number, with unified billing and crediting. Calling and messaging capability is maintained with friends and family back home.

Figure 8:
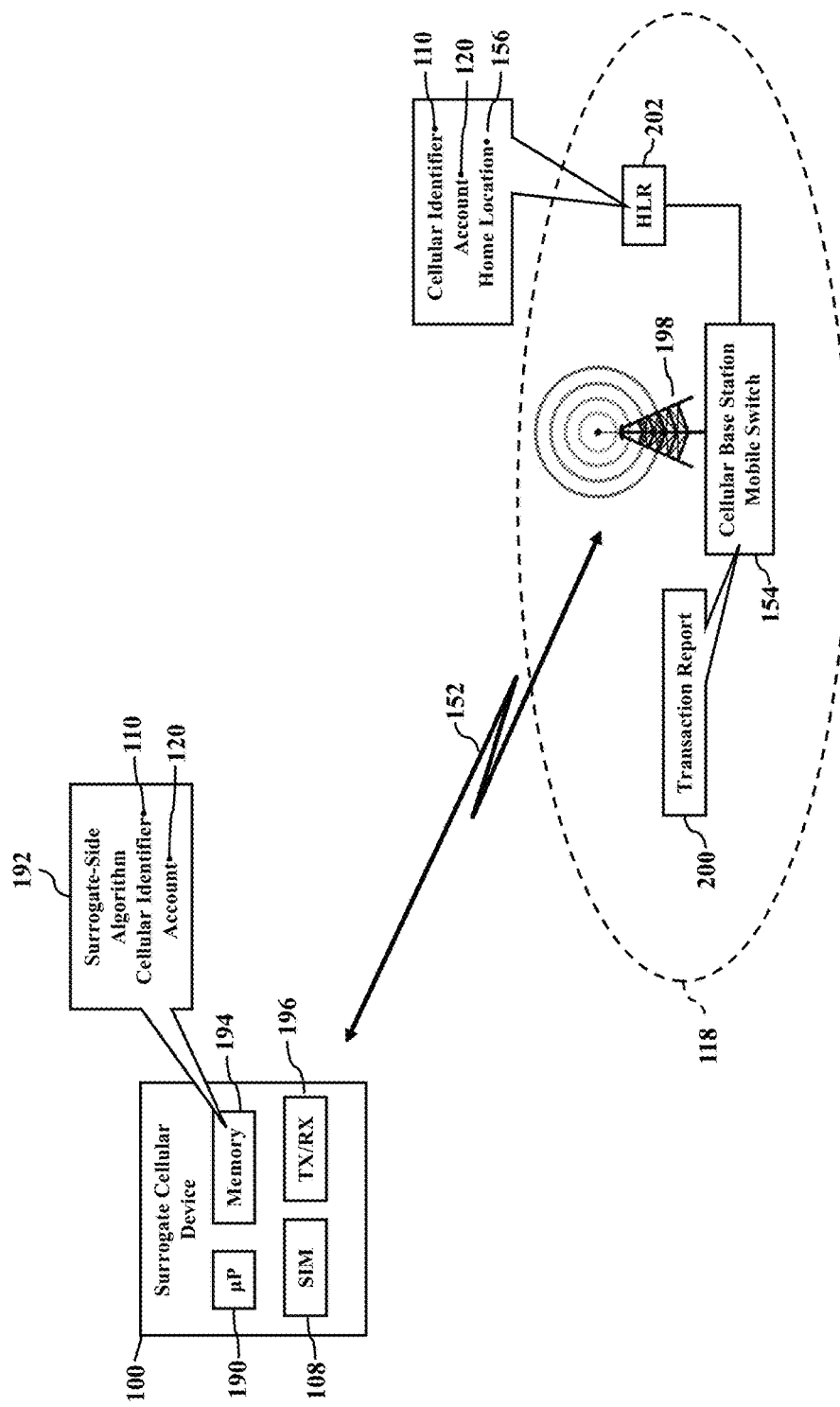
FIGS. 8-9 illustrate a more detailed operating environment, according to exemplary embodiments.
Figure 9:
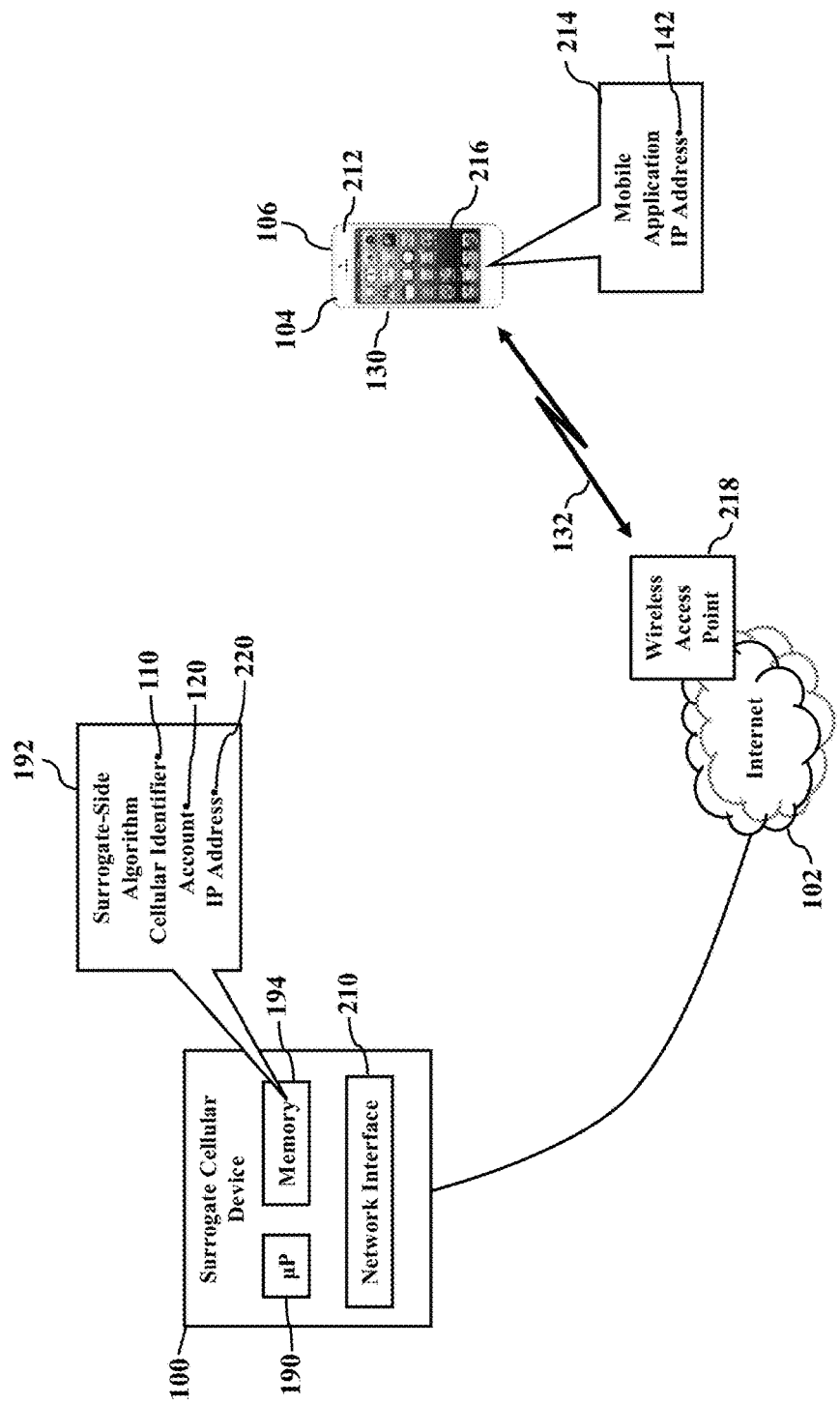
Figure 10:
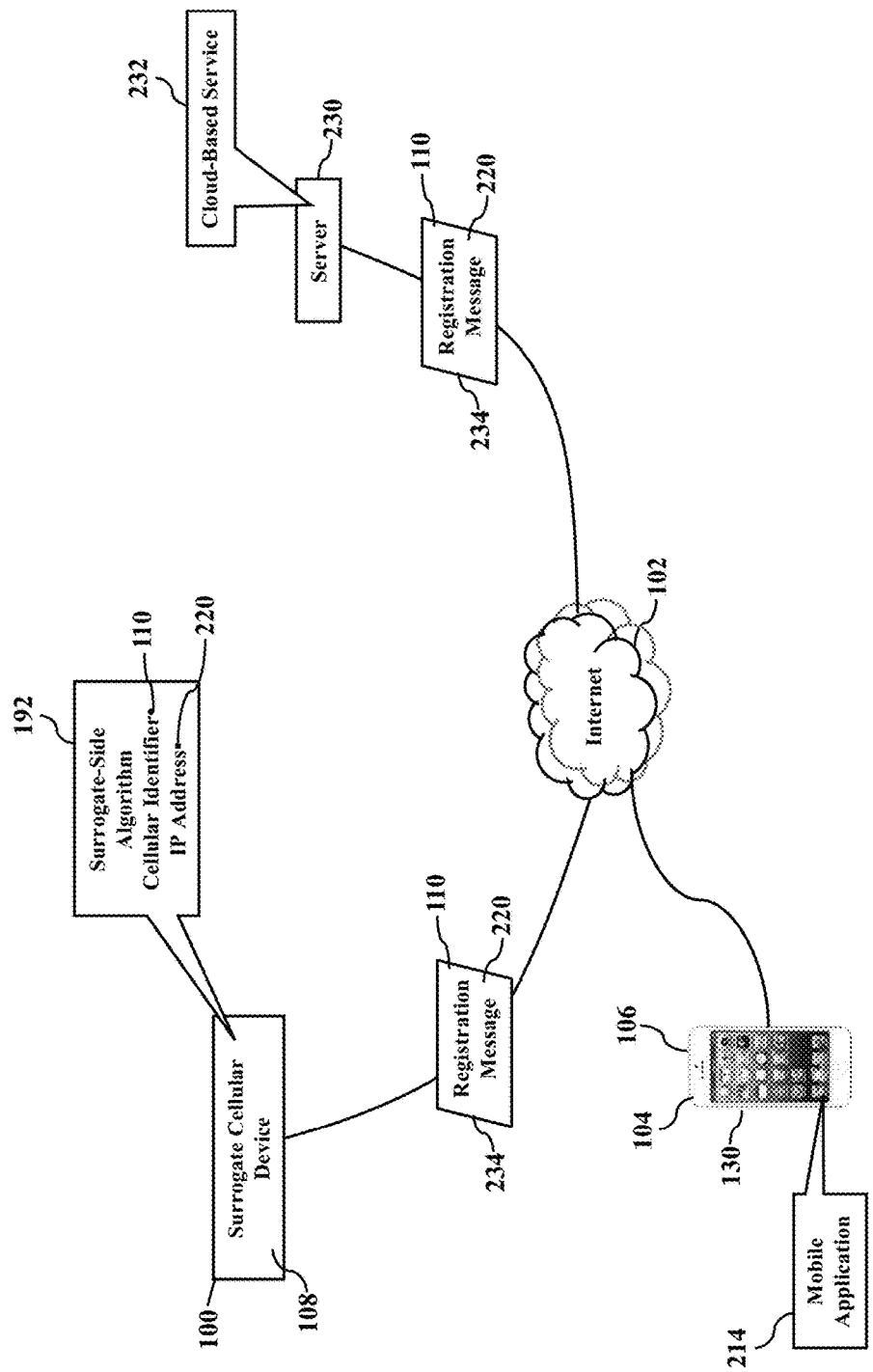
FIGS. 10-13 illustrate service registration, according to exemplary embodiments.

FIGS. 8-9 illustrate a more detailed operating environment, according to exemplary embodiments. The surrogate cellular device 100 communicates with the cellular base station 154 via the radio communication 152. The surrogate cellular device 100 has a hardware processor 190 (e.g., "μP"), application specific integrated circuit (ASIC), or other component that executes a surrogate-side algorithm 192 stored in a local memory device 194. The surrogate-side algorithm 192 instructs the hardware processor 190 to perform operations, such as interfacing with the subscriber identity module ("SIM") 108 to obtain the cellular identifier 110 associated with the cellular account 120. The surrogate-side algorithm 192 may further cause the hardware processor 190 to interface with a cellular transceiver ("TX/RX") 196 to establish the radio communication 152 with the cellular base station 154. As long as the cellular transceiver 196 remains within a broadcast transmission range of an antenna 198, the cellular base station 154 and the surrogate cellular device 100 may conduct the radio communications 152. The componentry and operation of the private cellular network 118 are well known, so this disclosure need not provide a more detailed explanation.

The cellular base station 154 may also document the radio communications 152. Each time the cellular base station 154 wirelessly transacts any data or message to/from the surrogate cellular device 100, the base station 154 may generate a corresponding transaction report 200. The cellular base station 154 may thus also interface with, and/or communicate with, a home location register (or "HLR") 202. The base station 154 may query the home location register 202 for informational details associated with the subscriber identity module 108, such as the cellular identifier 110, the account 120, and its associated home location 156. The cellular identifier 110 may be any alphanumeric combination that uniquely identifies the cellular transceiver 196 operating in the surrogate cellular device 100. The cellular identifier 110, for example, may be a cellular telephone number, an International Mobile Subscriber Identity (or "IMSI"), or a Mobile Station International Subscriber Directory Number ("MSISDN"). The base station 154 generates the transaction report 200 that details the cellular identifier 110, a date and time, and a duration of the radio communications 152 with the cellular transceiver 196. The operation of the home location register 202 is well known, so this disclosure need not provide a detailed explanation.

FIG. 9 illustrates additional networking. Here the surrogate cellular device 100 may also establish communication with the mobile device 104 via a communications network (such as the public Internet 102). For simplicity, FIG. 9 again illustrates the mobile device 104 as the SIMless smartphone 106. The surrogate-side algorithm 192 may instruct the hardware processor 190 to call or invoke a network interface 210 to an Internet Service Provider (or "ISP") providing access to the public Internet 102. The SIMless smartphone 106 has a hardware processor 212 (e.g., "μP"), application specific integrated circuit (ASIC), or other component that executes a mobile application 214 stored in a local memory device 216. The mobile application 214 instructs the hardware processor 212 to perform operations, such as invoking a network interface 216 to also establish communication with the public Internet 102. As the reader may understand, perhaps the SIMless smartphone 106 interfaces with a wireless access point 218 providing the wireless local area network (or "WI-FI") 132. The surrogate-side algorithm 192 and the mobile application 214 may thus cooperate to send and receive information as packets of data according to a packet protocol (such as any of the Internet Protocols). The packets of data contain bits or bytes of data describing the contents, or payload, of a message. A header of each packet of data may contain routing information identifying an origination address and/or a destination address. The surrogate-side algorithm 192 and the mobile application 214, for example, may instruct their respective processors 190 and 212 to inspect any packet of data for the cellular identifier 110 and/or the Internet Protocol addresses 220 and 142 associated, respectively, with the surrogate cellular device 100 and the SIMless smartphone 106.

Exemplary embodiments may be applied regardless of networking environment. Exemplary embodiments may be easily adapted to stationary or mobile devices having public cellular, WI-FI®, near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

FIGS. 10-13 illustrate service registration, according to exemplary embodiments. Here a server 230 may act as an intermediary that controls or manages communications between the surrogate cellular device 100 and the SIMless smartphone 106. That is, the server 230 may perform a cloud-based service 232 for reducing or even eliminating cellular roaming. A third party service provider, for example, may offer the surrogate cellular device 100 to purchasers, lessees, or subscribers. The surrogate cellular device 100 may interface with the server 230 to convert and route cellular calls, cellular messages, and cellular data into Internet traffic without roaming. When the surrogate cellular device 100 receives electrical power and registers its network presence and/or availability, the surrogate-side algorithm 192 may then cause the surrogate cellular device 100 to send a registration message 234 via the Internet 102 to the server 230. The registration message 234 may be packetized and include the cellular identifier 110 assigned to the subscriber identity module 108 and/or the Internet protocol address 220 assigned to the surrogate cellular device 100.

Figure 11:
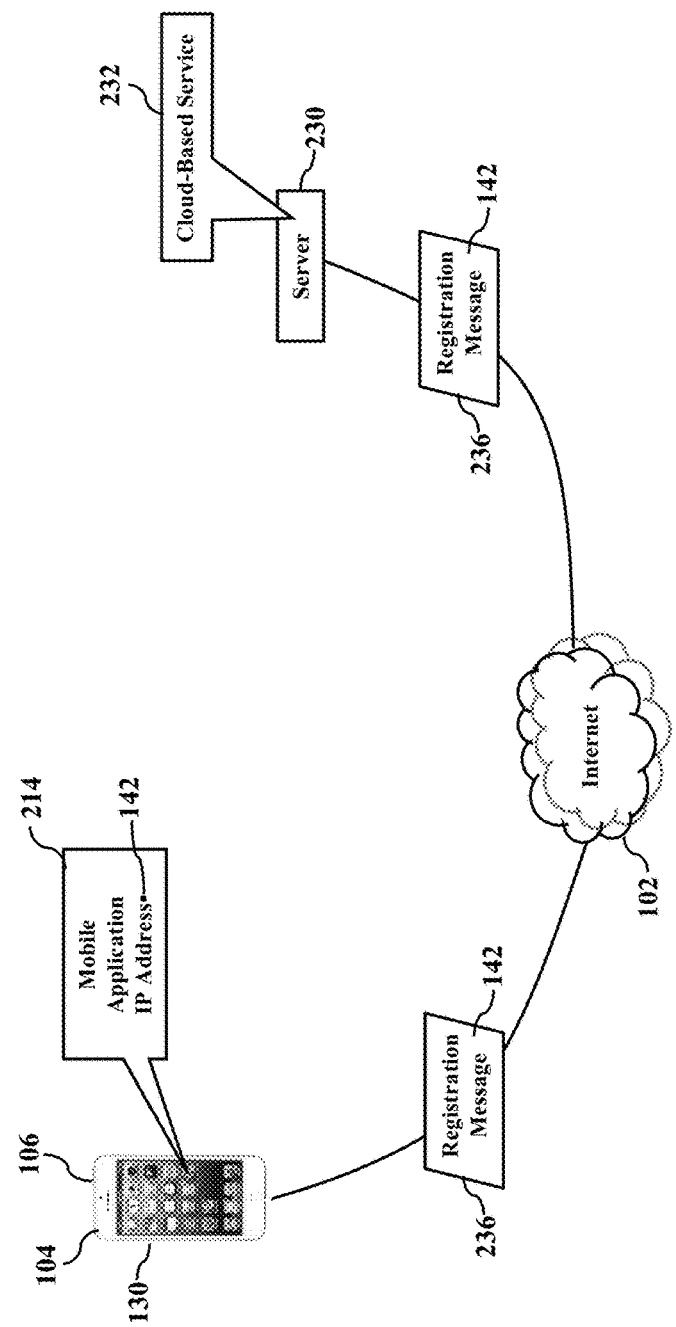

As FIG. 11 illustrates, the SIMless smartphone 106 may also register with the server 230 for its cloud-based service 232. When the SIMless smartphone 106 receives electrical power and registers its network presence and/or availability, the mobile application 214 may then cause the SIMless smartphone 106 to send a registration message 236 via the Internet 102 to the server 230. The registration message 236 may be packetized and include the Internet protocol address 142 assigned to the SIMless smartphone 106.

Figure 12:
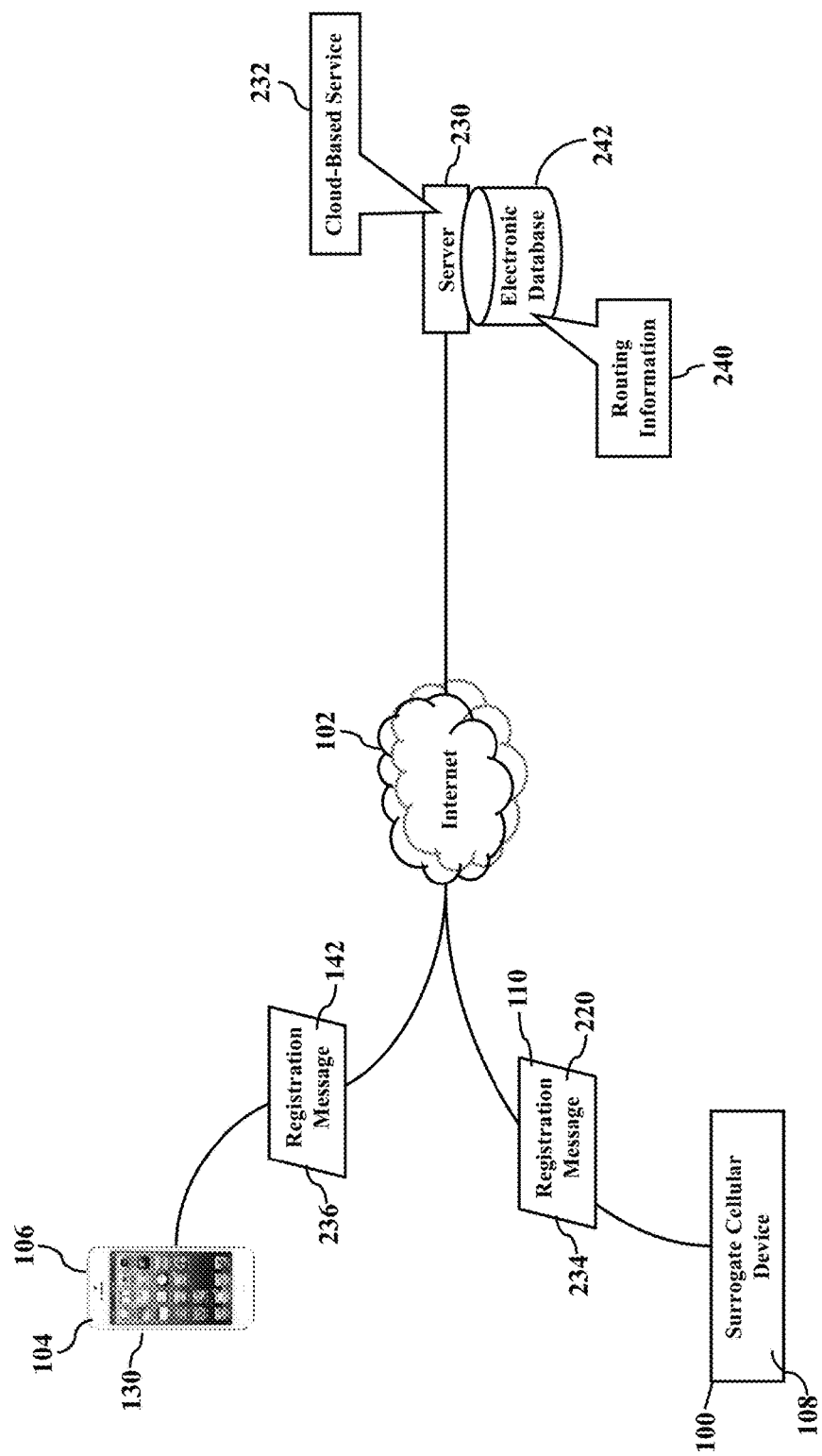
Figure 13:
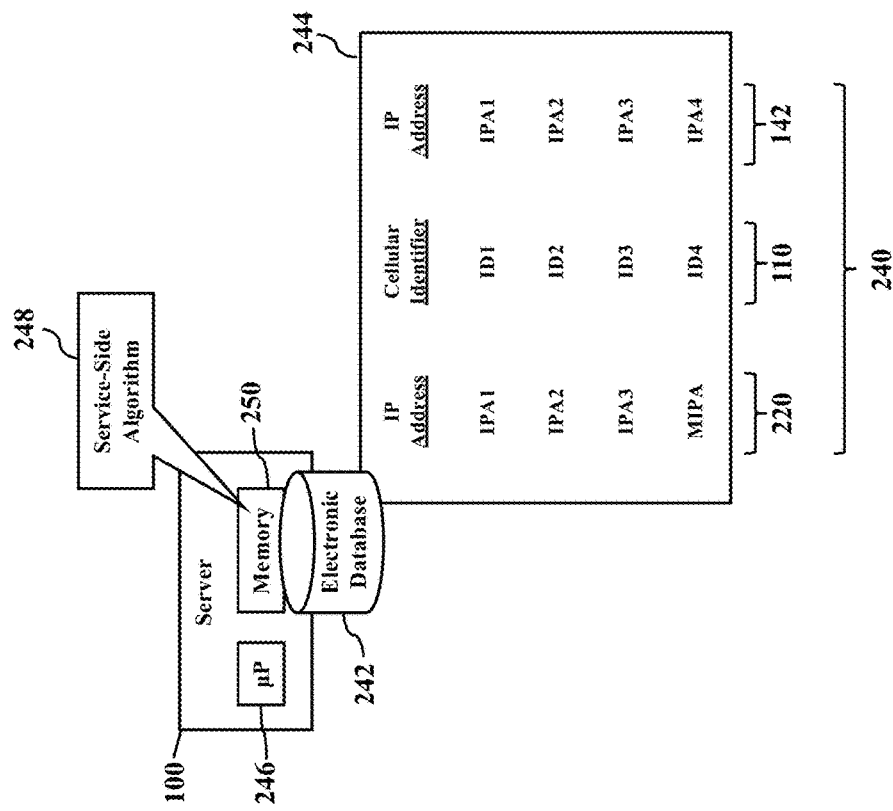

FIGS. 12-13 illustrate routing information 240. When the server 230 receives the registration messages 234 and 236, the server 230 may add the cellular identifier 110 and the Internet protocol addresses 142 and 220 as electronic entries to an electronic database 242. The electronic database 242 stores the routing information 240 for providing the cloud-based service 232. FIG. 13 illustrates the electronic database 242 as a table 244 that electronically maps, relates, or associates different network addresses associated with endpoint devices. The server 230 may thus have a hardware processor 246 (e.g., "µP"), application specific integrated circuit (ASIC), or other component that executes a service-side algorithm 248 stored in a local memory device 250. The service-side algorithm 248 instructs the hardware processor 246 to perform operations, such as inspecting the registration messages 234 and 236 (illustrated in FIG. 12) specifying the cellular identifier 110 and/or either Internet protocol address 142 and 220. The service-side algorithm 248 then instructs the hardware processor 246 to add the cellular identifier 110 and the Internet protocol addresses 142 and 220 as one or more entries to the electronic database 242.

The server 230 may then send registration responses confirming registration for the cloud-based service 232.

Figure 14:
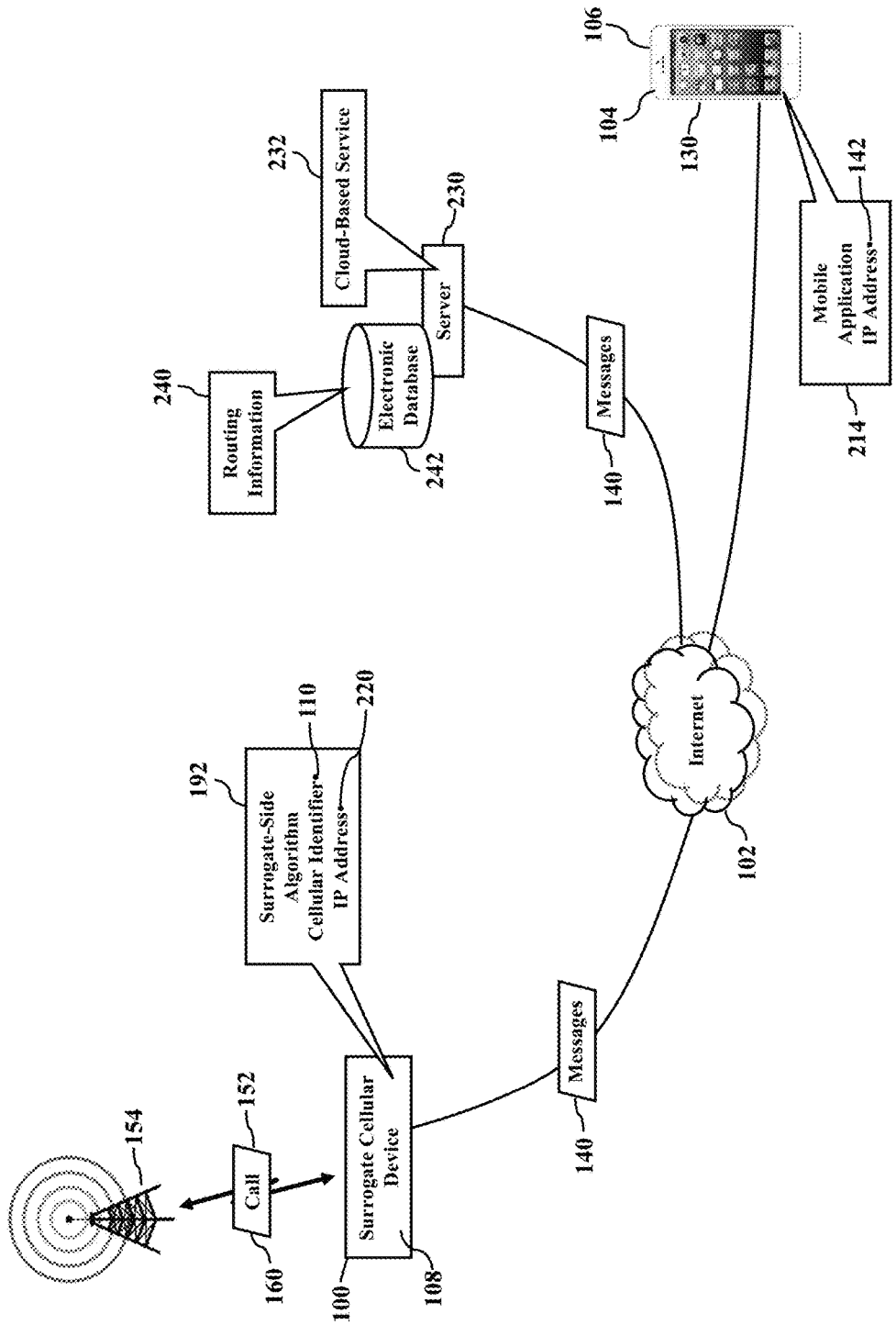
FIGS. 14-15 illustrate a cloud-based service, according to exemplary embodiments.
Figure 15:
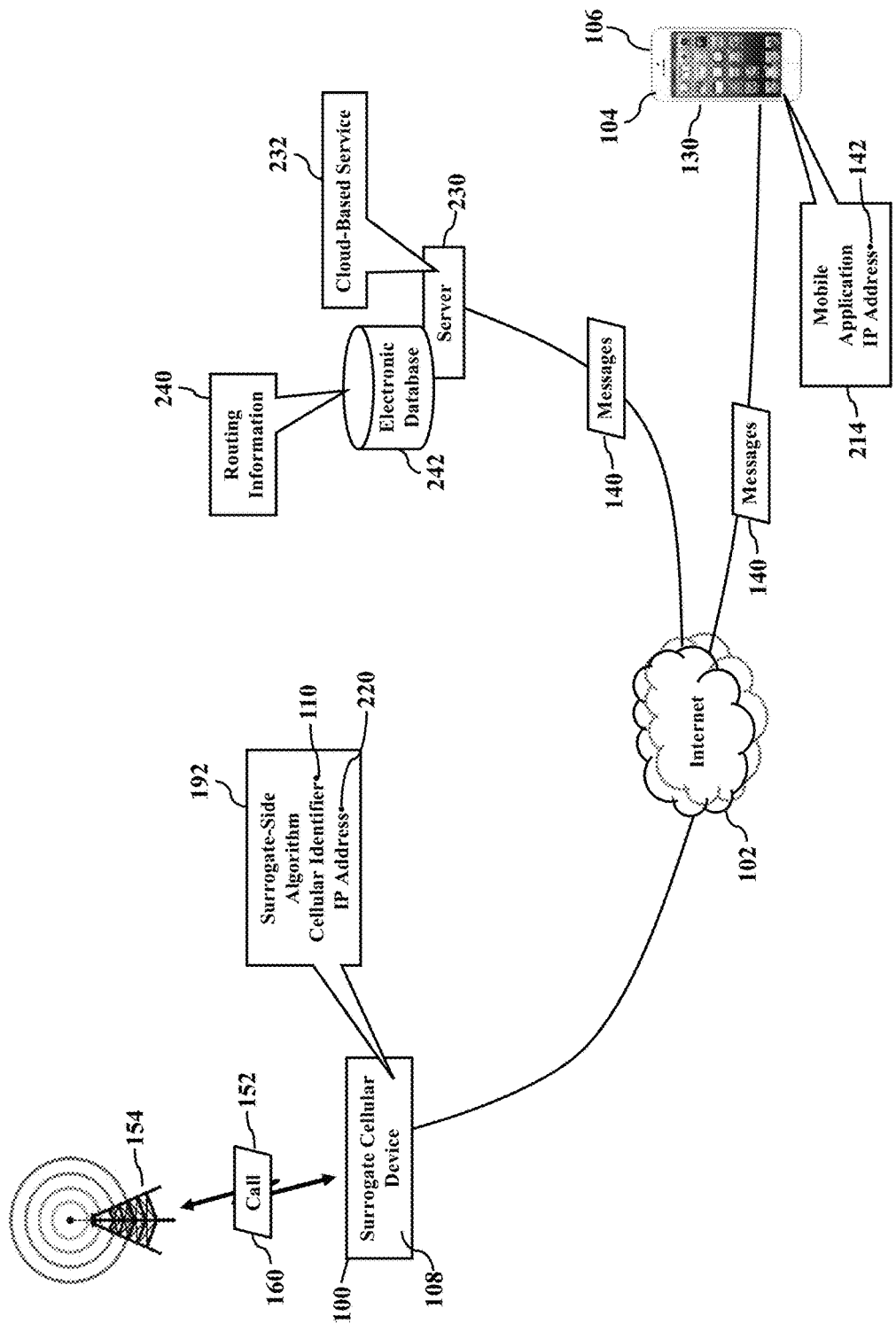

FIGS. 14-15 illustrate the cloud-based service 232, according to exemplary embodiments. Once registration is complete, the server 230 may consult the routing information 240 when providing the cloud-based service 232. For example, when the surrogate cellular device 100 uses the subscriber identity module 108 to register for the radio communications 152, the surrogate cellular device 100 may receive the cellular call 160 transmitted by the base station 154. The surrogate cellular device 100 may then convert the cellular call 160 into the Internet messages 140 and send the Internet messages 140 into the public Internet 102 for routing to the Internet protocol address associated with the server 230.

The server 230 may consult the electronic database 242. Whenever the server 230 provides the cloud-based service 232, the server 230 may require routing translation to determine the IP address 142 assigned to the SIMless smartphone 106. For example, when the surrogate cellular device 100 sends the Internet messages 140 via the Internet 102 to the server 230, the server 230 may query the electronic database 242 for the Internet protocol address 220 assigned to the surrogate cellular device 100. The server 230 may thus retrieve the corresponding Internet protocol address 142 that is registered with the SIMless smartphone 106. The server 230 may thus forward or send the Internet messages 140 via the Internet 102 to the Internet protocol address 142 assigned to the SIMless smartphone 106. The cloud-based service 232 has thus determined the endpoint addresses 220 and 142 needed to convert the cellular call 160 into Internet traffic for cellularless roaming.

As FIG. 15 illustrates, the server 230 may perform a similar mapping for the SIMless smartphone 106. When the SIMless smartphone 106 sends the Internet messages 140 to the surrogate cellular device 100, the server 230 may intercept and provide the cloud-based service 232. The mobile application 214 may be configured to send the Internet messages 140 to the Internet protocol address associated with the server 230. When the server 230 receives the Internet messages 140, the server 230 may query the electronic database 242 for the Internet protocol address 142 assigned to the SIMless smartphone 106. The server 230 may thus retrieve the corresponding cellular identifier 110 and/or the Internet protocol address 220 that is/are registered to the surrogate cellular device 100. The server 230 may thus forward or send the Internet messages 140 via the Internet 102 to the Internet protocol address 220 assigned to the surrogate cellular device 100.

Exemplary embodiments may thus provide the cloud-based service 232. The server 230 allows the user to carry her SIMless smartphone 106 anywhere in the world and still maintain Internet-based communication with the surrogate cellular device 100. As long as the SIMless smartphone 106 is reachable via the Internet 102, the server 230 may facilitate communication with the surrogate cellular device 100. The SIMless smartphone 106 may thus operate worldwide without incurring charges for cellular roaming. The SIMless smartphone 106 and the surrogate cellular device 100 may thus cooperate to convert and route cellular calls and cellular data into Internet traffic with little or no roaming. The server 230 maintains the routing information 240, thus relieving the user from entering and constantly updating networking details. The SIMless smartphone 106, in plain words, roams without incurring excess charges.

The cloud-based service 232 may have many users. This disclosure provides a simple explanation using the single SIMless smartphone 106 and the single surrogate cellular device 100. In actual practice, though, exemplary embodiments may serve hundreds, thousands, or even millions of different surrogate cellular devices and their corresponding endpoint devices. The electronic database 242 may thus have hundreds, thousands, or even millions of entries for many users and many endpoint devices. The server 230 may thus provide the cloud-based service 232 for many different surrogate cellular devices and other endpoint devices, perhaps in a client-server relationship. The routing details may thus be transparent to the users for ease of setup and use.

Figure 16:
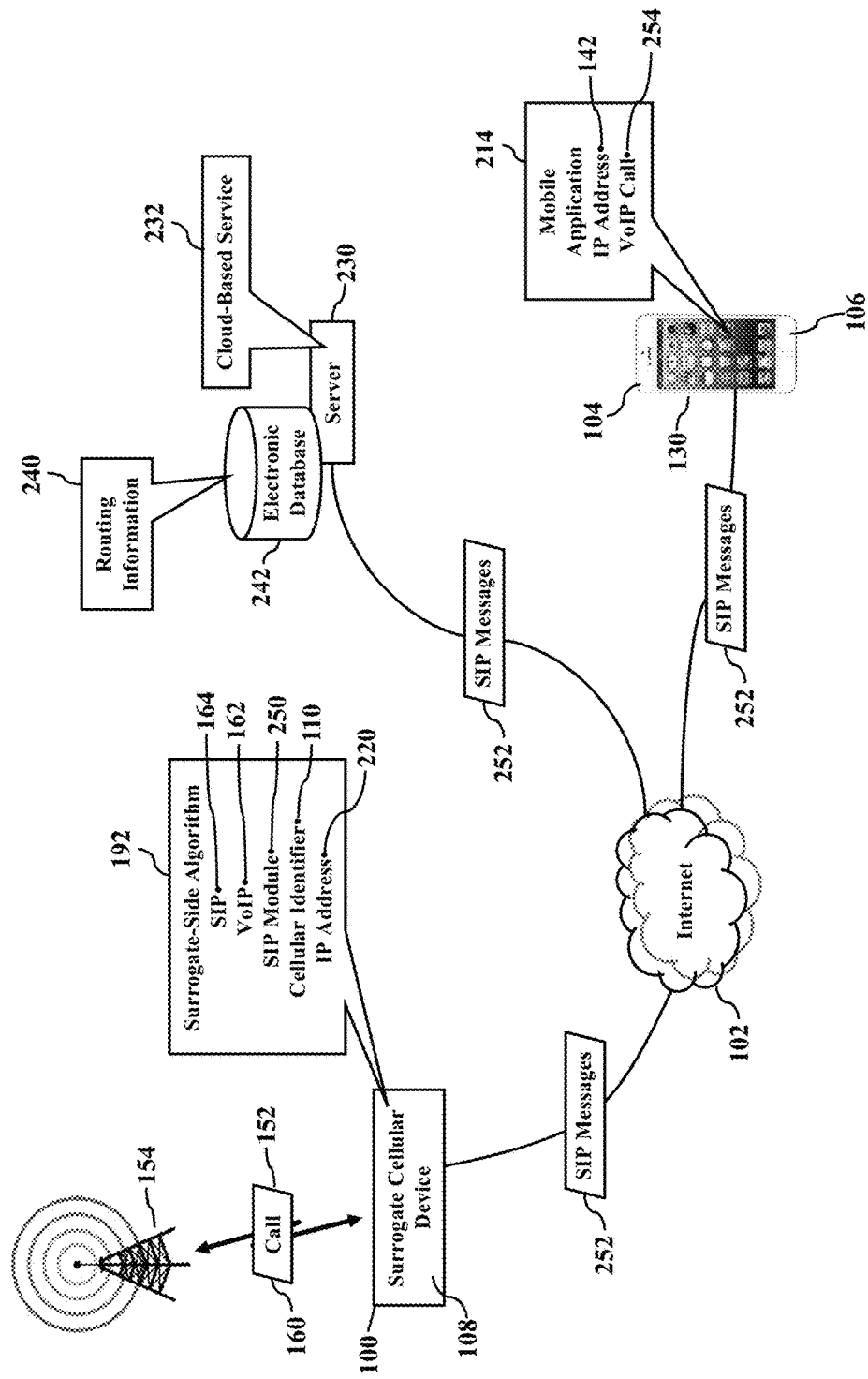
FIGS. 16-18 illustrate SIP messaging, according to exemplary embodiments.
Figure 17:
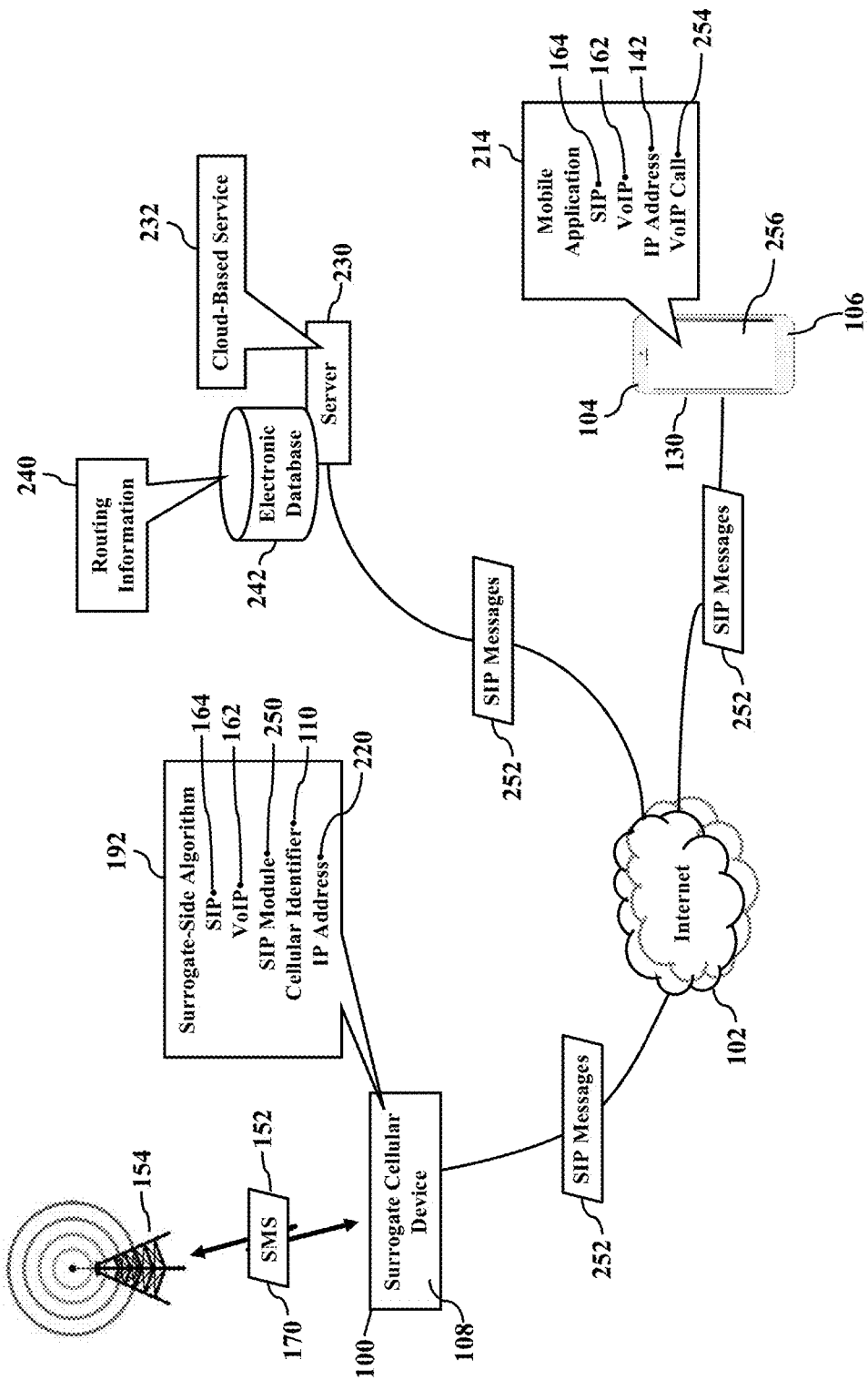
Figure 18:
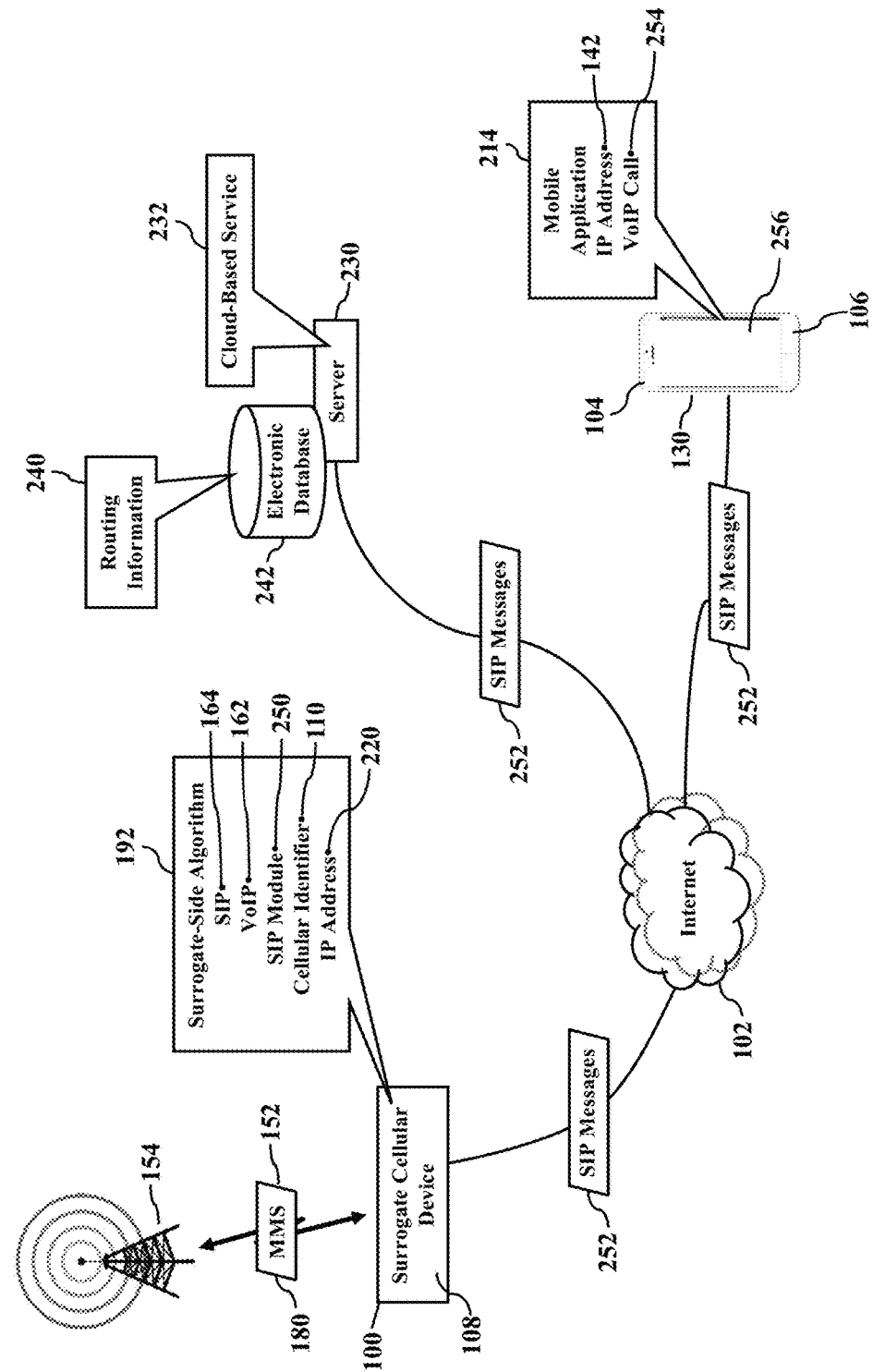

FIGS. 16-18 illustrate SIP messaging, according to exemplary embodiments. Here exemplary embodiments may use the Session Initiation Protocol (or "SIP") 164 when converting cellular telephony functions and services (such as the cellular call 160) into Internet telephony traffic (such as the Voice over Internet Protocol technology 162). For example, the surrogate-side algorithm 192 may cause the surrogate cellular device 100 to call or invoke a SIP module 250. The SIP module 250 uses the Session Initiation Protocol 164 to convert the cellular call 160 into SIP messages 252. The Session Initiation Protocol 164 is a communications protocol for signaling and controlling multimedia communication sessions between endpoints. The surrogate cellular device 100 may then route the SIP messages 252 via the Internet 102 to the server 230. The server 230 queries the electronic database 242 for the Internet protocol address 220 assigned to the surrogate cellular device 100. The server 230 retrieves the corresponding Internet protocol address 142 registered to the SIMless smartphone 106. The server 230 may then forward or send the SIP messages 252 via the Internet 102 to the SIMless smartphone 106 associated with the Internet protocol address 142.

Exemplary embodiments may also use VoIP techniques. When the SIMless smartphone 106 receives the SIP messages 252, the mobile application 214 may process the SIP messages 252 as a Voice-over Internet Protocol ("VoIP") call 254. As the user of the SIMless smartphone 106 speaks and converses, her speech is converted to additional SIP messages 252 and sent via the Internet 102 to the server 230 and/or directly to the surrogate cellular device 100. The server 230, for example, may query the electronic database 242 for the Internet protocol address 142 assigned to the SIMless smartphone 106 and retrieve the corresponding Internet protocol address 220 registered with the surrogate cellular device 100. The server 230 may then forward or send the SIP messages 252 via the Internet 102 to the Internet protocol address 220 assigned to the surrogate cellular device 100. When the surrogate cellular device 100 receives the SIP messages 252, the surrogate-side algorithm 192 may cause the surrogate cellular device 100 to convert the SIP messages 252 into the cellular call 160. That is, exemplary embodiments convert cellular calls into VoIP calls, and vice versa, using the Voice over Internet Protocol technology 162 and/or the Session Initiation Protocol 164. The surrogate cellular device 100 may then transmit the cellular call 160 to the cellular base station 154.

FIG. 17 illustrates the SMS text message 170. Here exemplary embodiments may use the Voice over Internet Protocol technology 162 and/or the Session Initiation Protocol 164 when processing the SMS text message 170. When the surrogate cellular device 100 receives the SMS text message 170 broadcast from the cellular base station 154, the surrogate cellular device 100 may call or invoke the SIP module 250 and convert the SMS text message 170 into the one or more SIP messages 252. The surrogate cellular device 100 may then route the SIP messages 252 via the Internet 102 to the server 230. The server 230 queries the electronic database 242 for the Internet protocol address 220 assigned to the surrogate cellular device 100. The server 230 retrieves the corresponding Internet protocol address 142 assigned to the SIMless smartphone 106. The server 230 may then forward or send the SIP messages 252 via the Internet 102 to the SIMless smartphone 106 associated with the Internet protocol address 142. When the SIMless smartphone 106 receives the SIP messages 252, the mobile application 214 may process the SIP messages 252 as text for display on a display device 256.

Text replies may be sent. If the user of the SIMless smartphone 106 wishes to send a textual reply to the SMS message 170, the SIMless smartphone 106 may convert the user's text into one or more of the SIP messages 252 (perhaps using the Voice over Internet Protocol technology 162 and/or the Session Initiation Protocol 164). The SIMless smartphone 106 sends the SIP messages 252 via the Internet 102 to the server 230. The server 230 queries the electronic database 242 for the Internet protocol address 142 assigned to the SIMless smartphone 106 and retrieves the corresponding Internet protocol address 220 assigned to the surrogate cellular device 100. The server 230 may then forward or send the SIP messages 252 via the Internet 102 to the Internet protocol address 220 assigned to the surrogate cellular device 100. When the surrogate cellular device 100 receives the SIP messages 252, the surrogate-side algorithm 192 may cause the surrogate cellular device 100 to convert the SIP messages 252 into the reply SMS text message 170. That is, exemplary embodiments convert SMS text messages into the Internet realm, and vice versa, using the Voice over Internet Protocol technology 162 and/or the Session Initiation Protocol 164. The surrogate cellular device 100 may then transmit the reply SMS text message 170 to the cellular base station 154.

FIG. 18 illustrates the MMS message 180. Here exemplary embodiments may use the Voice over Internet Protocol technology 162 and/or the Session Initiation Protocol 164 when processing the MMS message 180. When the surrogate cellular device 100 receives the MMS message 180 broadcast from the cellular base station 154, the surrogate cellular device 100 converts the MMS message 180 into the one or more SIP messages 252. The SIP messages 252 are sent via the Internet 102 to the server 230, and the server 230 queries the electronic database 242 to retrieve the Internet protocol address 142 registered to the SIMless smartphone 106. The server 230 may then forward or send the SIP messages 252 via the Internet 102 to the SIMless smartphone 106 associated with the Internet protocol address 142. When the SIMless smartphone 106 receives the SIP messages 252, the mobile application 214 may process the SIP messages 252 as audio/video for display on the display device 256. The user of the SIMless smartphone 106 may also send a reply, where the SIP messages 252 generated by the SIMless smartphone 106 are sent via the Internet 102 to the server 230. The server 230 queries the electronic database 242 and retrieves the corresponding Internet protocol address 220 registered to the surrogate cellular device 100. The server 230 may then forward or send the SIP messages 252 via the Internet 102 to the surrogate cellular device 100. When the surrogate cellular device 100 receives the SIP messages 252, the surrogate-side algorithm 192 may cause the surrogate cellular device 100 to convert the SIP messages 252 into the MMS message 180 for transmission to the cellular base station 154. Again, then, exemplary embodiments may convert MMS messages into the SIP messages 252, and vice versa, using the Voice over Internet Protocol technology 162 and/or the Session Initiation Protocol 164.

Exemplary embodiments thus reduce or eliminate roaming. When the SIMless smartphone 106 communicates with the surrogate cellular device 100, the SIMless smartphone 106 may physically roam the world without incurring cellular roaming fees and charges. The SIMless smartphone 106 and the surrogate cellular device 100 may thus cooperate to convert the cellular calls and data into Internet traffic according to the Voice over Internet Protocol technology 162 and/or the Session Initiation Protocol 164. Exemplary embodiments may thus bypass the public switched telephone network and also eliminate domestic and international roaming in cellular networks. The surrogate cellular device 100 may thus remain in its home location 156 to minimize expenses.

Figure 19:
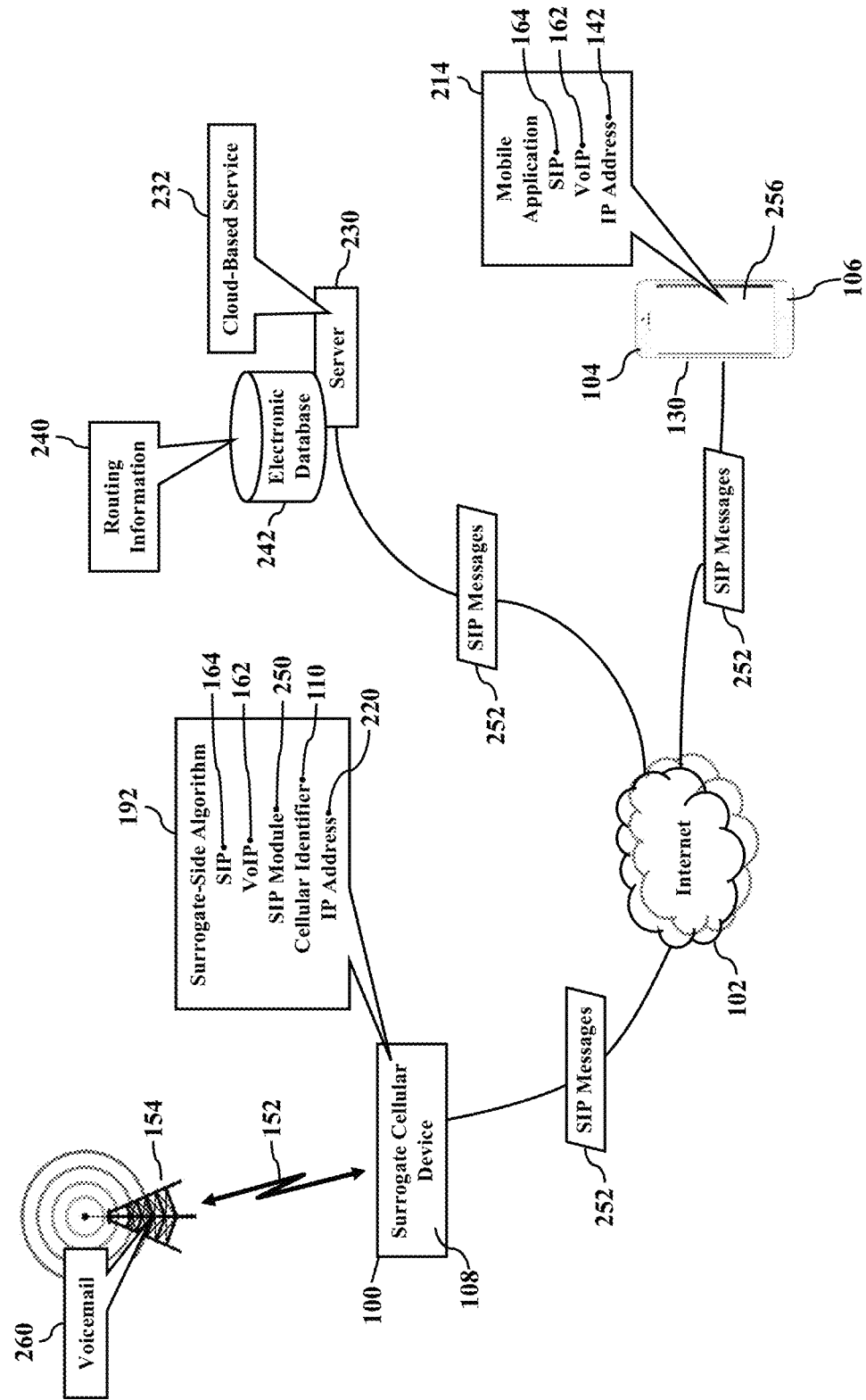
FIGS. 19-21 illustrate voicemail messaging, according to exemplary embodiments.
Figure 20:
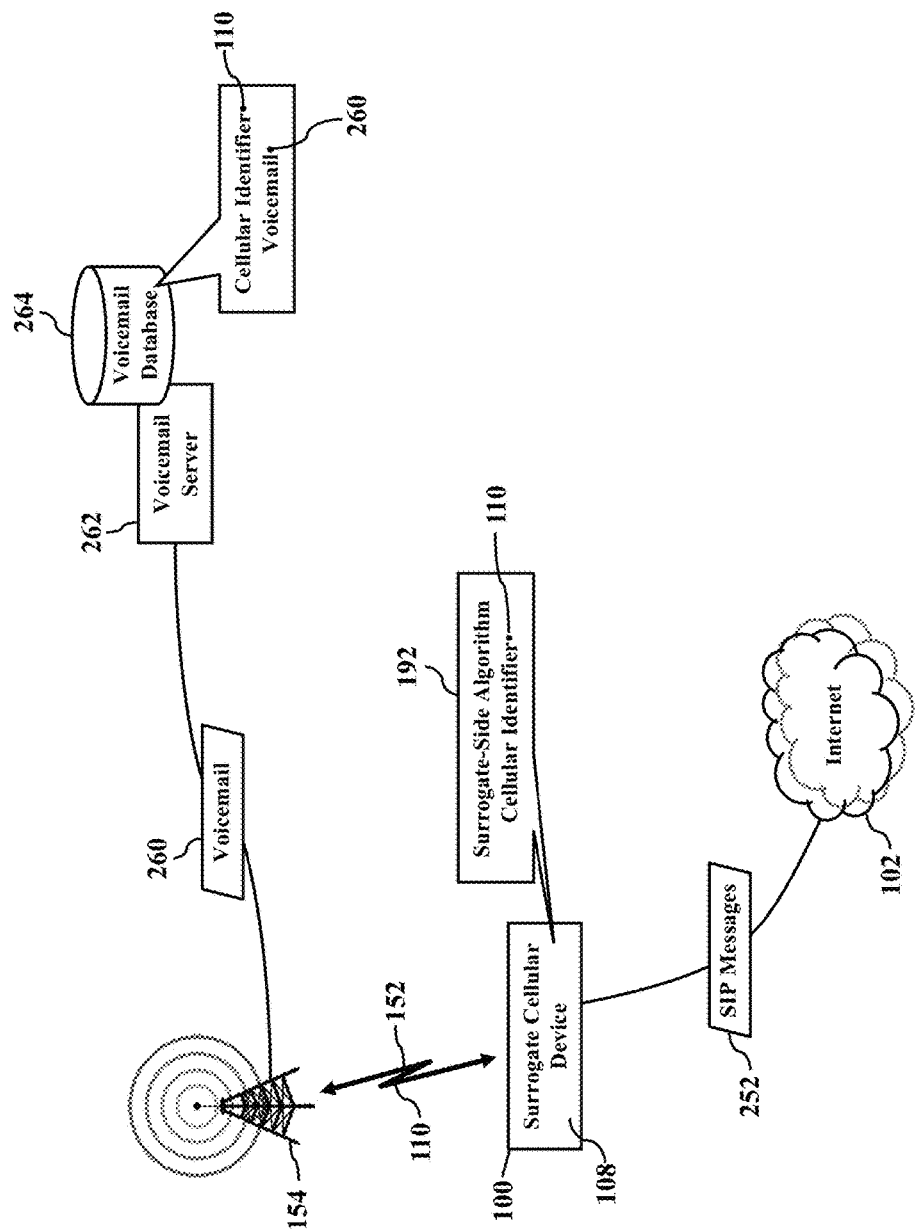
Figure 21:
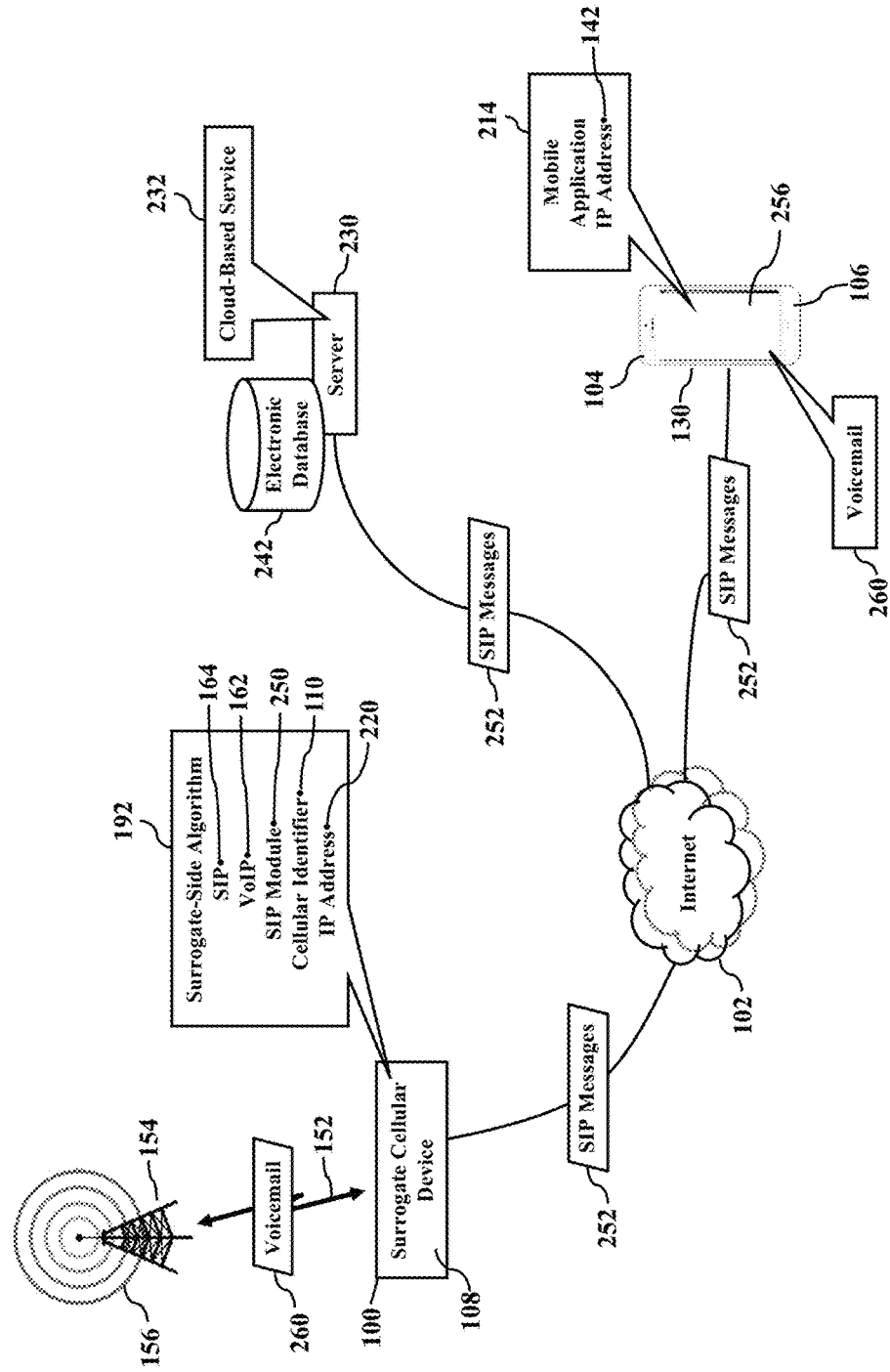

FIGS. 19-21 illustrate voicemail messaging, according to exemplary embodiments. Here exemplary embodiments may use the Voice over Internet Protocol technology 162 and/or the Session Initiation Protocol 164 to retrieve a voicemail 260 via the cellular base station 154. Suppose, for example, the user makes an input to her smartphone 106 (perhaps to the capacitive, touch-sensitive display device 256) to retrieve the voicemail 260. The mobile application 214 may convert the user's input into the one or more SIP messages 252 according to the Session Initiation Protocol 164. As the reader may understand, the Session Initiation Protocol 164 defines many requests, responses, notifications, and other commands that provide telephony functions and services.

The server 230 may then provide its cloud-based service 232. Because the SIM 108 is installed in the surrogate cellular device 100, the SIMless smartphone 106 may only provide its Internet protocol address 142. The SIMless smartphone 106 sends the SIP messages 252 containing a voicemail request and specifying the Internet protocol address 142. The SIMless smartphone 106 sends the SIP messages 252 to the server 230, and the server 230 queries the electronic database 242 for the Internet protocol address 142 assigned to the SIMless smartphone 106. The routing information 240 thus reveals the corresponding Internet protocol address 220 assigned to the surrogate cellular device 100. The server 230 may then forward or send the SIP messages 252 via the Internet 102 to the surrogate cellular device 100 associated with the Internet protocol address 220. When the surrogate cellular device 100 receives the SIP messages 252, the surrogate-side algorithm 192 may cause the surrogate cellular device 100 to process the SIP messages 252 as the radio transmission 152 to the cellular base station 154.

FIG. 20 illustrates voicemail retrieval. When the cellular base station 154 receives the radio transmission 152 requesting the voicemail 260, the radio transmission 152 contains data or information identifying the cellular identifier 110 associated with the subscriber identity module 108 (installed in the surrogate cellular device 100). The cellular base station 154 then interfaces with a voicemail server 262 to retrieve the voicemail 260. Voicemail service is well known, so this disclosure need not present a detailed explanation. Suffice it to say that the cellular base station 154 sends a voicemail request to the voicemail server 262, and the voicemail request specifies the cellular identifier 110 determined from the radio transmission 152. The voicemail server 262 queries a voicemail database 264 for the cellular identifier 110 and retrieves the corresponding voicemail 260. The voicemail server 262 then sends the voicemail 260 back to the cellular base station 154 for the radio transmission 152 to the surrogate cellular device 100.

FIG. 21 illustrates voicemail delivery. The cellular base station 154 broadcasts the voicemail 260 as the radio transmission 152 to the surrogate cellular device 100. The surrogate cellular device 100 may then convert the voicemail 260 for the Internet realm using the Voice over Internet Protocol technology 162 and/or the Session Initiation Protocol 164. For example, the voicemail 260 may be converted into the SIP messages 252 for delivery via the Internet 102 to the server 230 (for the cloud-based service 232, as explained with reference to FIGS. 10-18) or directly to the SIMless smartphone 106. Regardless, when the SIMless smartphone 106 receives the SIP messages 252, the mobile application 214 may process the SIP messages 252 as audio, thus audibly reproducing the voicemail 260.

Again, then, exemplary embodiments thus reduce or eliminate roaming. The user of the SIMless smartphone 106 is able to retrieve the voicemail 260 using both the private cellular network 118 and the public Internet 102 without incurring cellular roaming fees and charges. Even if the SIMless smartphone 106 roams to an international location far outside the home location 156, exemplary embodiments spoof the home location 156. Exemplary embodiments deceive the cellular network 118 into logging the home location 156 associated with the subscriber identity module 108, even though the voicemail 260 was actually routed hundreds or thousands of miles from the home location 156.

Figure 22:
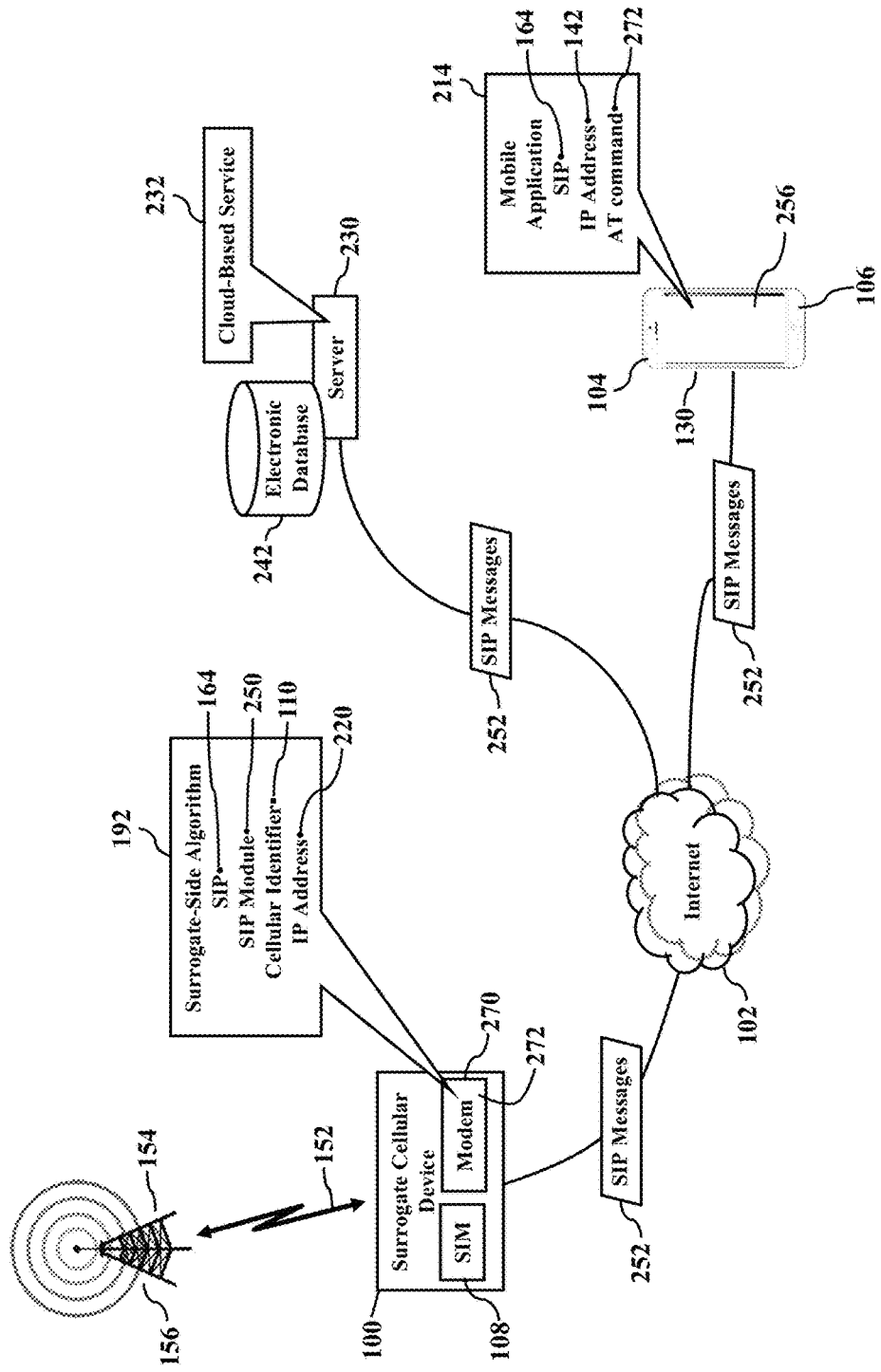
FIG. 22 illustrates modem commands, according to exemplary embodiments.

FIG. 22 illustrates modem commands, according to exemplary embodiments. Here exemplary embodiments may be used to communicate various modem commands to the surrogate cellular device 100. As the reader may understand, the surrogate cellular device 100 may have a modulator/demodulator ("Modem") 270. The modem 270 responds to various commands, such as AT commands 272 specified and formatted according to the ETSI GSM 07.07 (3GPP TS 27.007) specification for controlling the GSM modem 270 and/or the ETSI GSM 07.05 (3GPP TS 27.005) specification for managing the Short Message Service (SMS) feature of GSM. Whenever the SIMless smartphone 106 sends the AT command 272, exemplary embodiments may convert the AT command 272 into the SIP messages 252, and vice versa, perhaps using the Session Initiation Protocol 164.

FIG. 22 illustrates an example. Suppose the SIMless smartphone 106 needs to send the AT command 272 to the surrogate cellular device 100. The AT command 272 may be used to interface with, or to remotely control, the modem 270 operating in the surrogate cellular device 100. The SIMless smartphone 106 may thus be used to remotely control or define the radio transmission 152 with the cellular base station 154. Regardless, the mobile application 214 causes the SIMless smartphone 106 to generate the AT command 272 and then convert or package the AT command 272 as the SIP messages 252. The SIMless smartphone 106 sends the SIP messages 252 to the server 230, and the server 230 queries the electronic database 242 and retrieves the Internet protocol address 220 assigned to the surrogate cellular device 100. The server 230 may then forward or send the SIP messages 252 via the Internet 102 to the surrogate cellular device 100 associated with the Internet protocol address 220. When the surrogate cellular device 100 receives the SIP messages 252, the surrogate-side algorithm 192 may cause the surrogate cellular device 100 to inspect or resolve the SIP messages 252 for the AT command 272. The surrogate cellular device 100 may thus execute the AT command 272 packaged within or specified by the SIP messages 252. The SIMless smartphone 106, in other words, remotely commanded the modem 270 operating in the surrogate cellular device 100 to perform some corresponding function or operation.

Figure 23:
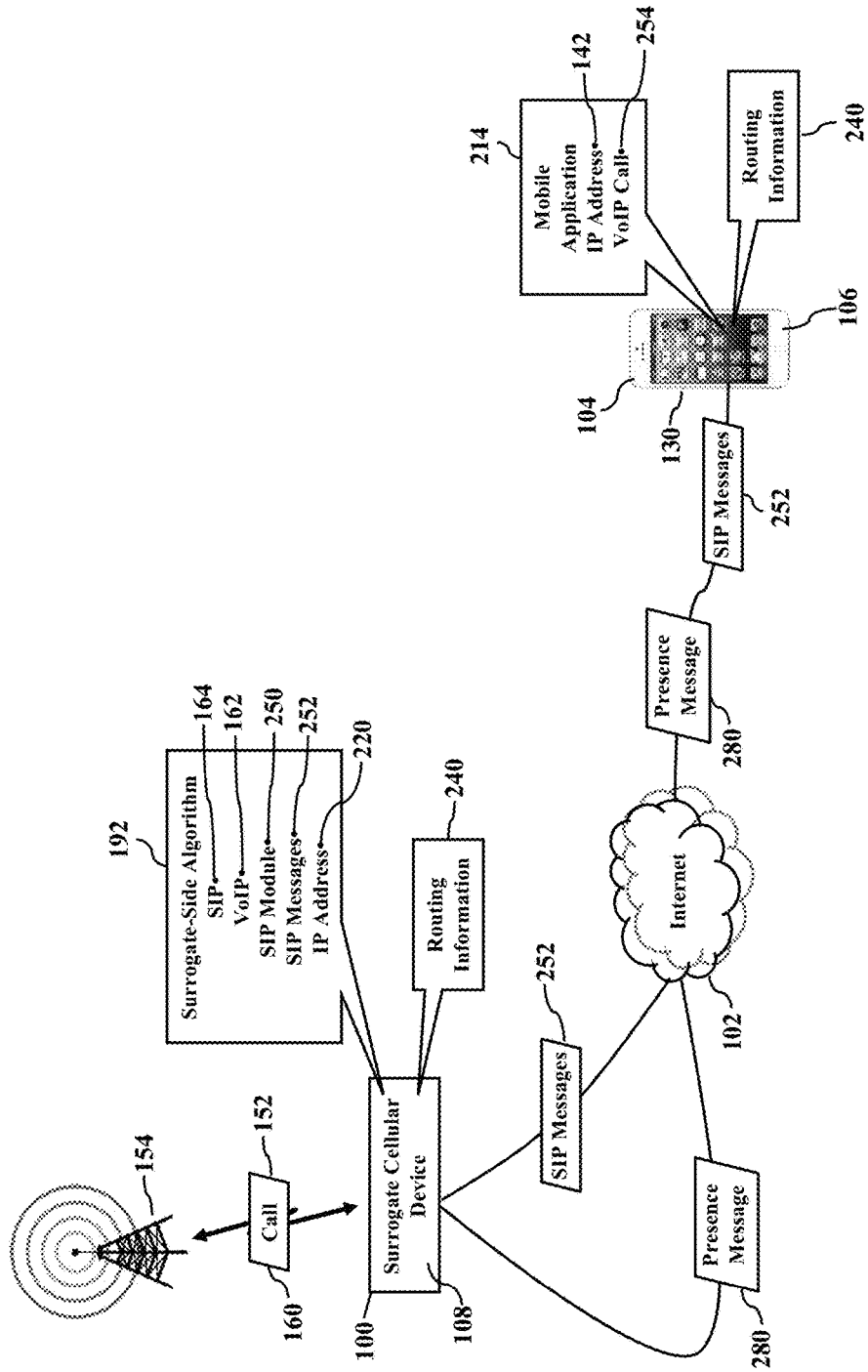
FIG. 23 illustrates local address translation, according to exemplary embodiments.

FIG. 23 illustrates local address translation, according to exemplary embodiments. Here the SIMless smartphone 106 and the surrogate cellular device 100 may each locally store the routing information 240. Suppose, again, that the surrogate cellular device 100 receives the cellular call 160 and converts the cellular call 160 into the SIP messages 252. Here, though, the surrogate cellular device 100 may locally determine the Internet protocol address 142 assigned to the SIMless smartphone 106. That is, the surrogate cellular device 100 may be assigned a static Internet protocol address 220 that seldom or rarely changes. If the SIMless smartphone 106 is preprogramed or configured with the static Internet protocol address 220, then the SIMless smartphone 106 and the surrogate cellular device 100 may directly communicate via the Internet 102 as endpoint devices. When the SIMless smartphone 106 registers its network presence with the public Internet 102, the mobile application 214 may then cause the SIMless smartphone 106 to send a presence message 280 via the Internet 102 to the static Internet protocol address 220 assigned to the surrogate cellular device 100. The presence message 280 may specify the dynamic or temporary Internet protocol address 142 assigned to the SIMless smartphone 106. The presence message 280 thus alerts or notifies the surrogate cellular device 100 of the Internet protocol address 142 assigned to the SIMless smartphone 106. Now that the SIMless smartphone's network address is known, the surrogate cellular device 100 may send the SIP messages 252 via the Internet 102 to the temporary Internet protocol address 142 assigned to the SIMless smartphone 106. The SIMless smartphone 106 and the surrogate cellular device 100, in other words, need not rely on the cloud-based service 232 provided by the server 230 (as illustrated with reference to FIGS. 10-18).

Figure 24:
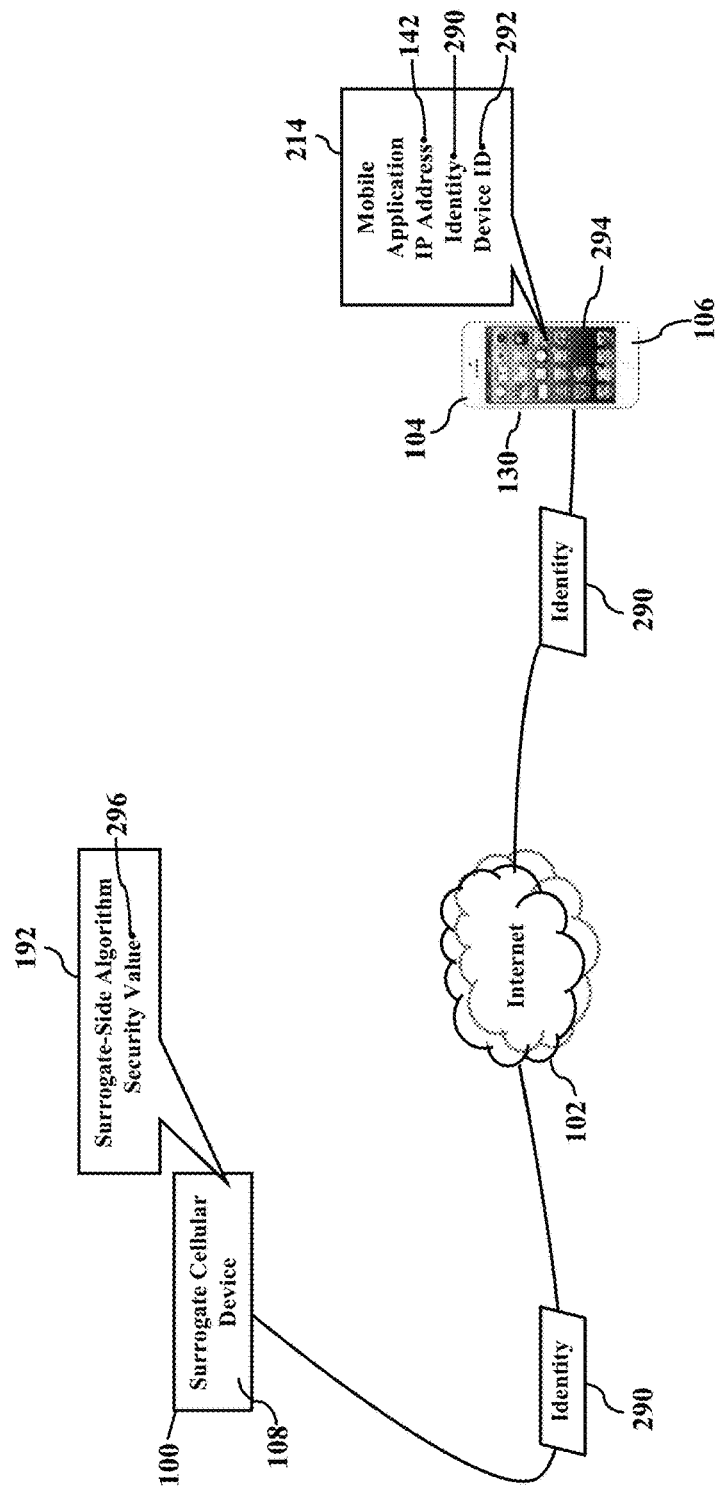
FIGS. 24-25 illustrate security enhancements, according to exemplary embodiments.
Figure 25:
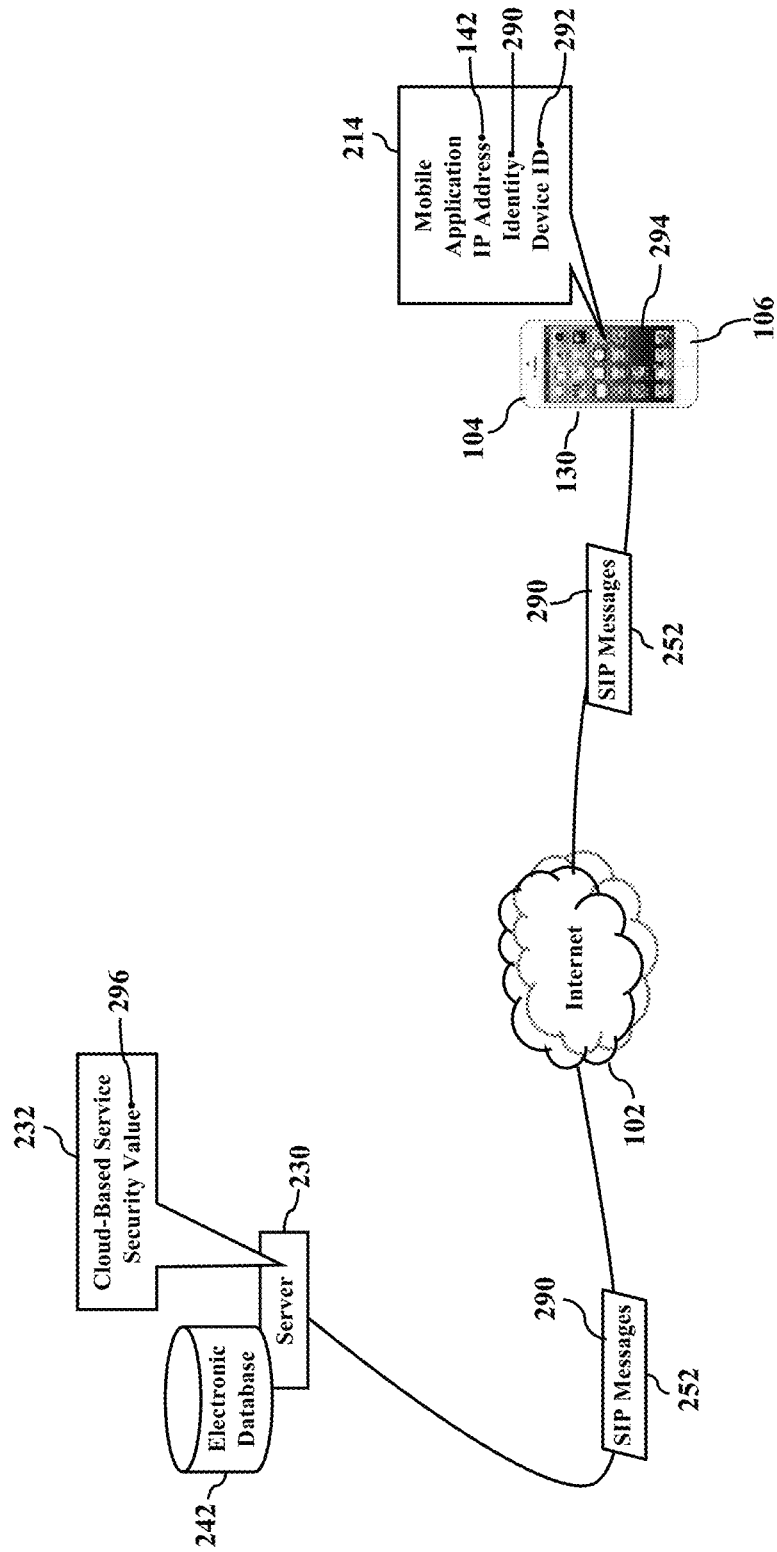
Figure 26:
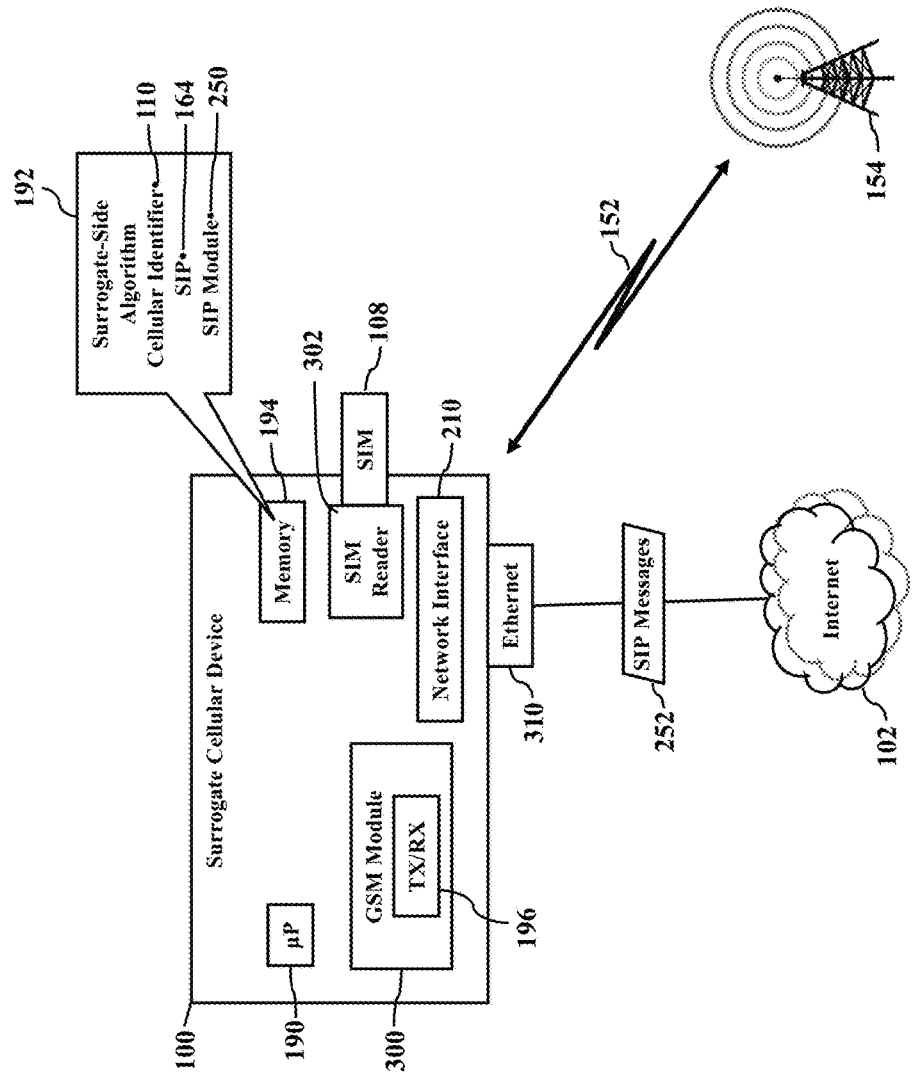
FIGS. 26-29 illustrate additional componentry of a surrogate cellular device, according to exemplary embodiments.

FIGS. 24-25 illustrate security enhancements, according to exemplary embodiments. Here exemplary embodiments may confirm an identity 290 associated with the SIMless smartphone 106. Recall that the SIMless smartphone 106 establishes communication via the pubic Internet 102. As the reader may understand, the public Internet 102 is often vulnerable to security threats. For example, WI-FI® networks using public frequencies are easily hacked, thus allowing unauthorized reception of information (such as credit card numbers, social security, and even the content of calls). Exemplary embodiments may thus require that the SIMless smartphone 106 prove its identity 290. FIG. 24, for example, illustrates a device identifier (or "Device ID") 292. When the surrogate cellular device 100 and the SIMless smartphone 106 communicate via the public Internet 102, the surrogate cellular device 100 may require that the SIMless smartphone 106 prove its identity 290 using the device identifier 292. The device identifier 292 may be any alphanumeric combination that uniquely identifies the SIMless smartphone 106. The device identifier 292, for example, may be a media access control (or "MAC") address assigned to a WI-FI® network interface 294 operating in the SIMless smartphone 106. The device identifier 292, however, may alternatively identify a hardware component, such as the processor 212 or the memory device 216 (illustrated in FIG. 9) operating in the SIMless smartphone 106. The identity 290, however, may also be configured by the user, thus allowing the user to enter her own unique alphanumeric combination. Regardless, when the surrogate cellular device 100 and the SIMless smartphone 106 communicate via the public Internet 102, the mobile application 214 may cause the SIMless smartphone 106 to include the identity 290 as information or data in a header or payload of any packet of data. The surrogate-side algorithm 192 may then instruct the surrogate cellular device 100 to inspect the packets of data for the identity 290. The identity 290 may then be compared to a predetermined or pre-configured security value 296 stored in the surrogate cellular device 100. If the identity 290 provided by the SIMless smartphone 106 matches the security value 296, then the surrogate-side algorithm 192 may permit or allow communication to commence, continue, or resume. The SIMless smartphone 106, in other words, is trusted as a rightful or authorized endpoint for cellularless roaming. However, if the identity 290 fails to match the security value 296, then the surrogate-side algorithm 192 may discontinue or halt communication. The SIMless smartphone 106 may not be trusted for cellularless roaming.

FIG. 25 illustrates a security measure for the cloud-based service 232 provided by the server 230. Here the cloud-based service 232 may require that the SIMless smartphone 106 prove the identity 290. That is, when the server 230 communicates with the SIMless smartphone 106 via the public Internet 102, the server 230 may require authentication as the rightful endpoint for cellularless roaming. Suppose when the SIMless smartphone 106 sends the SIP messages 252, one or more packets may specify the identity 290. When the server 230 receives the SIP messages 252, the server 230 may inspect the packets of data for the identity 290 and compare to the predetermined or pre-configured security value 296 associated with the cloud-based service 232. If the identity 290 provided by the SIMless smartphone 106 matches the security value 296, then the server 230 may commence, continue, or resume the cloud-based service 232 for cellularless roaming. However, if the identity 290 fails to match the security value 296, then the server 230 may discontinue or halt the cloud-based service 232, as the SIMless smartphone 106 may be untrusted or ineligible for cellularless roaming.

FIGS. 26-29 illustrate additional componentry of the surrogate cellular device 100, according to exemplary embodiments. The hardware processor 190 executes the surrogate-side algorithm 192 stored in the local memory device 194. The hardware processor 190 may also interface with a GSM module 300 having the cellular transceiver ("TX/RX") 196. The subscriber identity module 108 inserts into a SIM card reader 302, thus allowing the GSM module 300 and the surrogate-side algorithm 192 to retrieve the cellular identifier 110. Once the subscriber identity module 108 is read, the hardware processor 190 instructs the cellular transceiver 196 to establish the radio communication 152 with the cellular base station 154.

Exemplary embodiments may include other modules. As the cellular transceiver 196 conducts the radio communications 152, the surrogate-side algorithm 192 instructs the hardware processor 190 to convert the radio communications 152. The surrogate-side algorithm 192, for example, may call or invoke the SIP module 250 for converting the radio communications 152 into the SIP messages 252 according to Session Initiation Protocol (or "SIP") 164. Because the surrogate cellular device 100 communicates with the public Internet 102, the surrogate cellular device 100 may also include the network interface 210. Because Ethernet technology is commonly used in most homes and businesses, the reader is thought most familiar with an Ethernet interface 310. The network interface 210, however, may use any networking technology. The surrogate cellular device 100 may thus use the Ethernet interface 310 to send the SIP messages 252 into the public Internet 102 for routing to a destination (such as the SIMless smartphone 106 illustrated in FIGS. 1-7).

Figure 27:
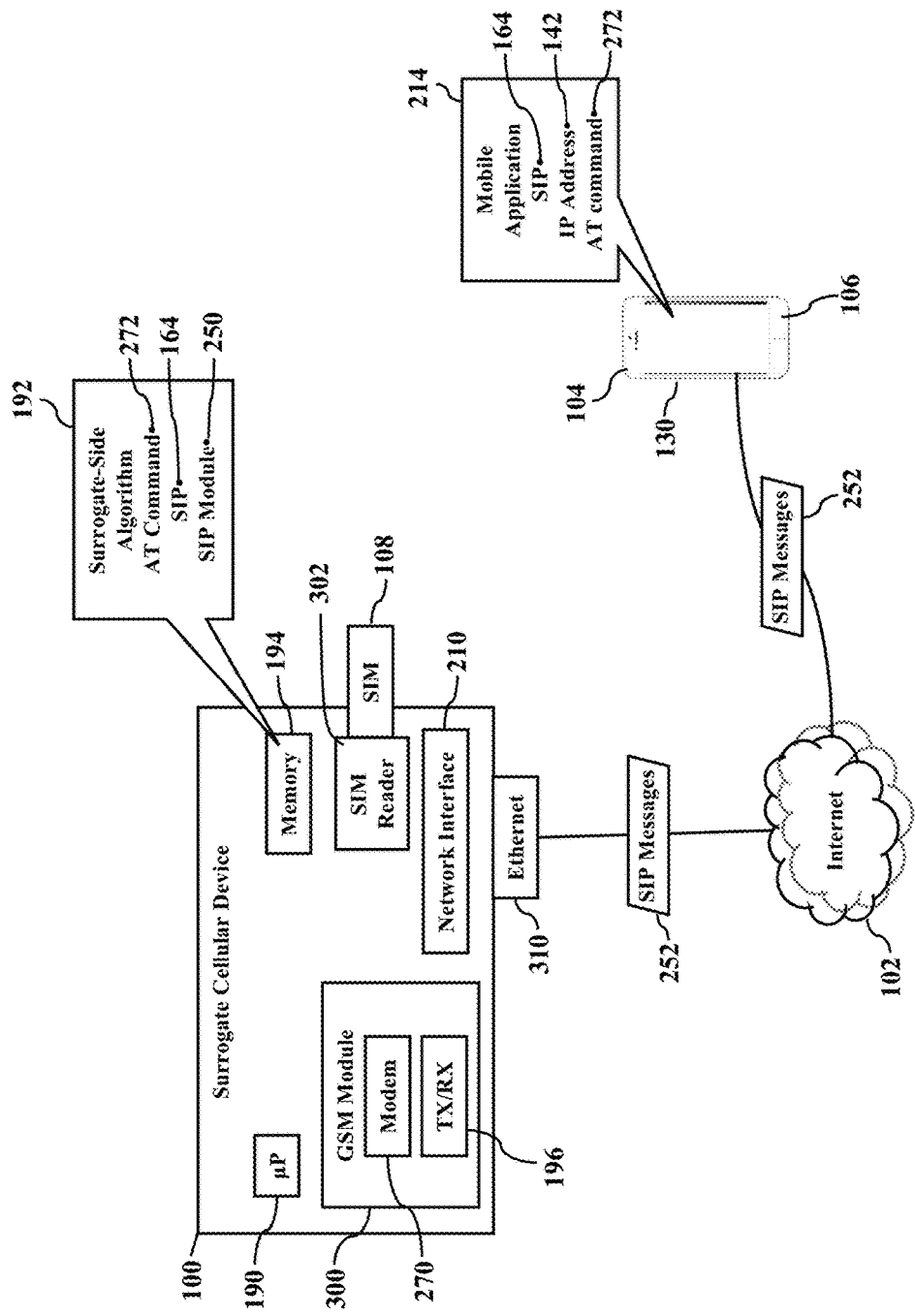

FIG. 27 illustrates the AT command 272. This disclosure previously explained how the surrogate cellular device 100 may receive the SIP messages 252 sent from the SIMless smartphone 106 (perhaps via the Ethernet interface 310 to the public Internet 102). The surrogate-side algorithm 192 may thus instruct the hardware processor 190 to resolve the SIP messages 252 into the AT command 272 for the modem 270 operating in the GSM module 300. Once the AT command 272 is determined, the surrogate cellular device 100 executes the corresponding function.

Figure 28:
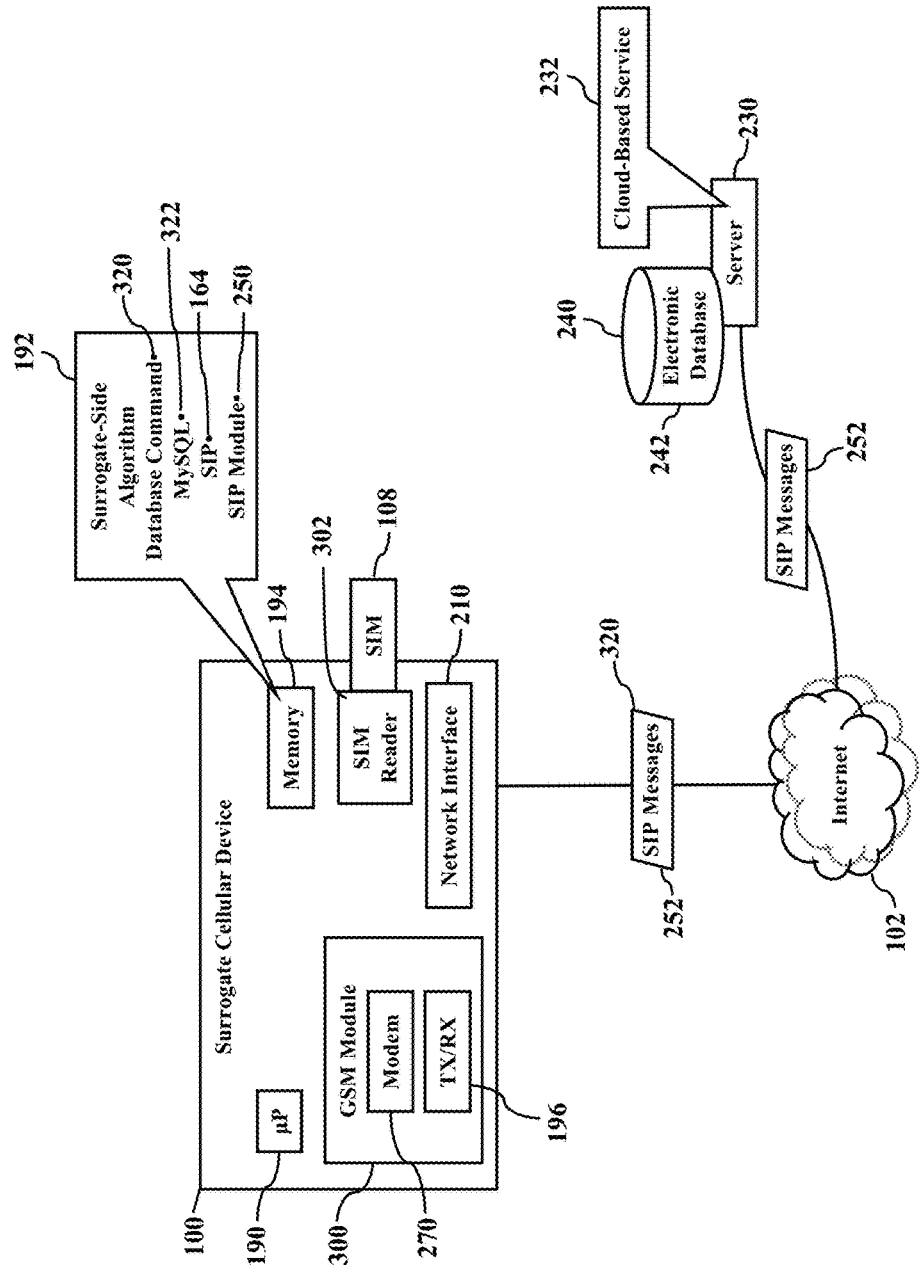

FIG. 28 illustrates database commands 320. This disclosure previously explained how exemplary embodiments may consult the electronic database 242 for the routing information 240. Exemplary embodiments may thus use any database management scheme to determine the routing information 240. FIG. 28, for example, illustrates the MySQL 322 relational database management system. The reader is thought familiar with this structured query language, as MySQL is used by many companies and people. Exemplary embodiments, though, may use any database management scheme. Regardless, the surrogate-side algorithm 192 may instruct the hardware processor 190 to use MySQL 322 when interfacing with the server 230. The surrogate-side algorithm 192 may instruct the hardware processor 190 to include, or to convert, any of the database commands 320 into the SIP messages 252 for transmission to the electronic database 242 (perhaps via the network interface 210 to the public Internet 102). The surrogate cellular device 100 is thus able to command the electronic database 242 to retrieve the routing information 240.

Figure 29:
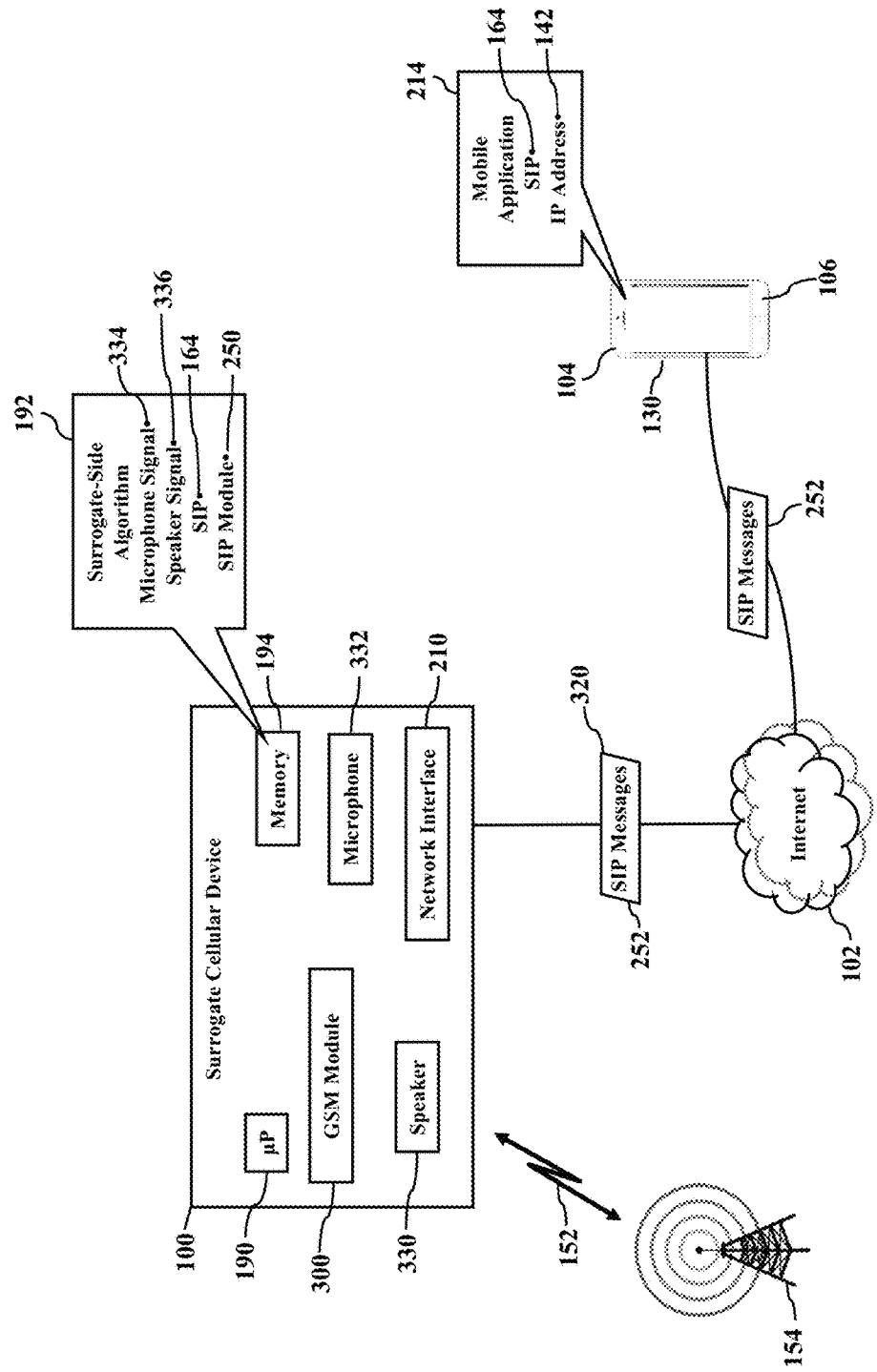

FIG. 29 illustrates other componentry. Because the hardware processor 190 interfaces with the GSM module 300, the surrogate cellular device 100 may have any man-machine interface. For example, the surrogate cellular device 100 may have an optional speaker 330 and a microphone 332. As the surrogate cellular device 100 communicates with the SIMless smartphone 106 (perhaps via the network interface 210 to the public Internet 102) and/or with the cellular base station 154, the surrogate cellular device 100 may thus function has a base station handset. A user of the surrogate cellular device 100, in other words, may speak into the microphone 332, and the surrogate cellular device 100 converts speech into microphone signals 334. The surrogate cellular device 100 may then transmit the microphone signals 334 as the radio communications 152 to the cellular base station 154. Moreover, the surrogate cellular device 100 may convert the microphone signals 334 into the SIP messages 252 for transmission to the SIMless smartphone 106 via the network interface 210 to the public Internet 102. Likewise, the radio communications 152 from the cellular base station 154, and any SIP messages 252 sent from the SIMless smartphone 106, may be processed as speaker signals 336 for audible output by the speaker 330. A user of the surrogate cellular device 100 may thus listen in and interject (such as during the cellular call 160 illustrated in FIGS. 14-16), thus allowing three-way or three-party conversation.

Figure 30:
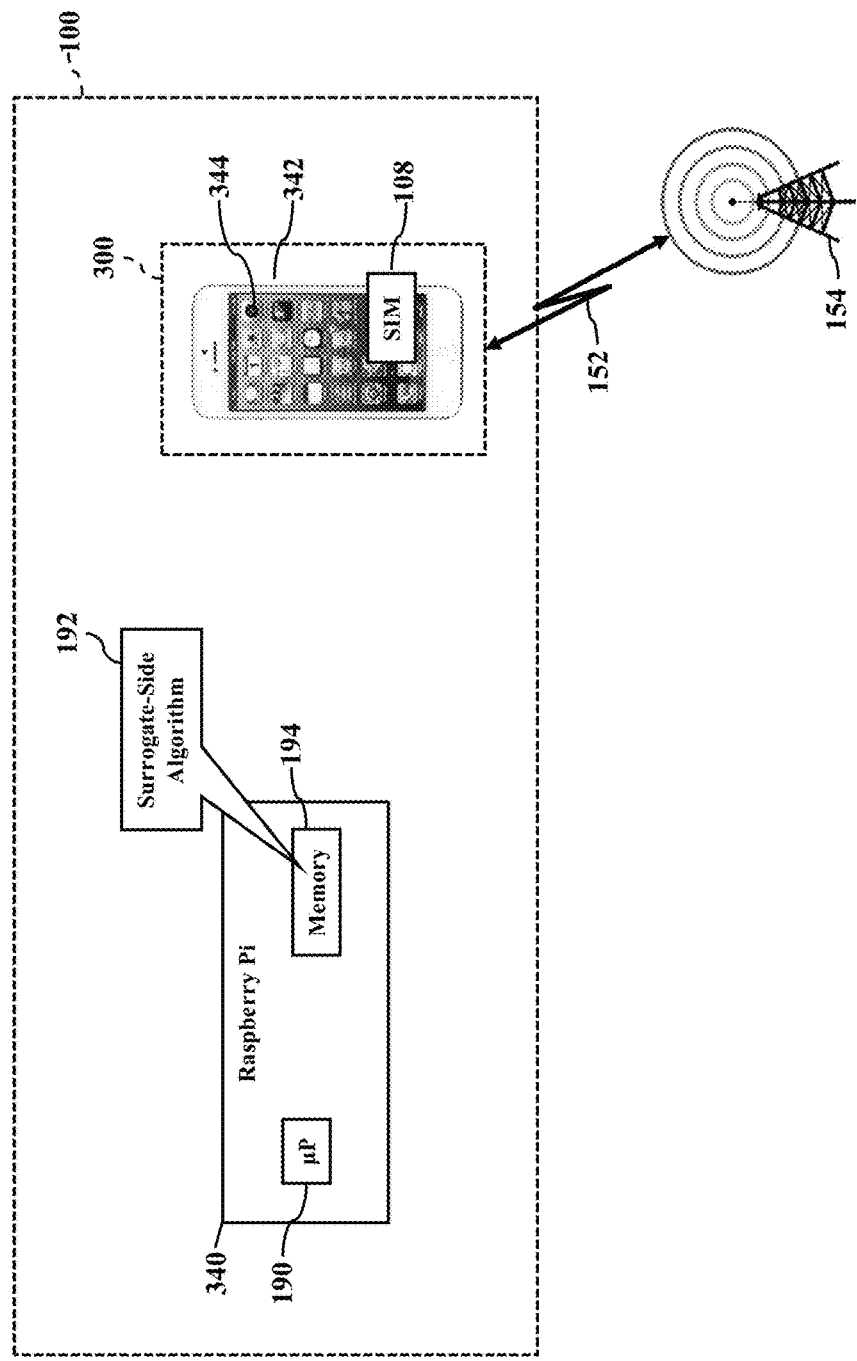
FIGS. 30-32 illustrate a prototype of a surrogate cellular device, according to exemplary embodiments.
Figure 31:
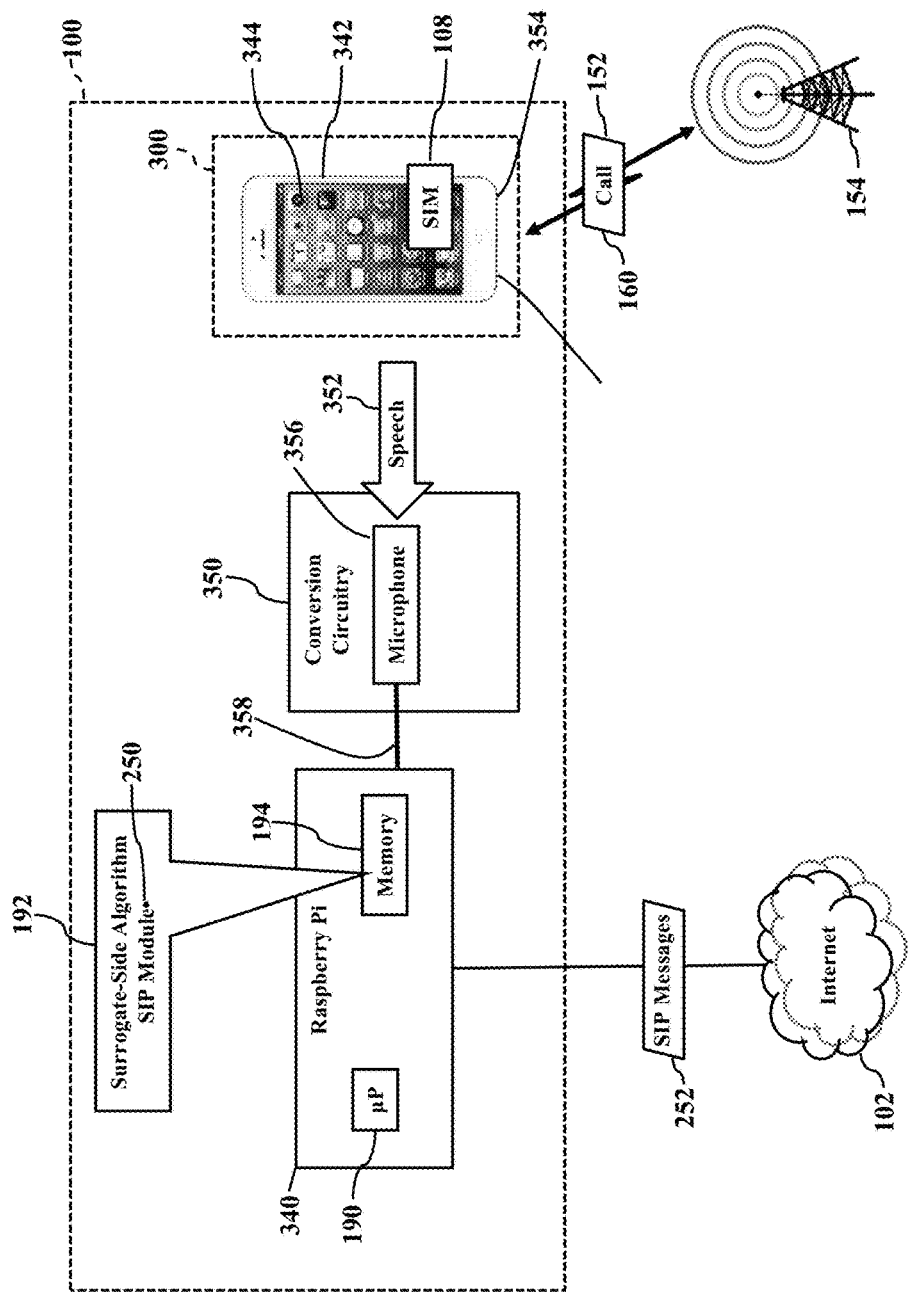
Figure 32:
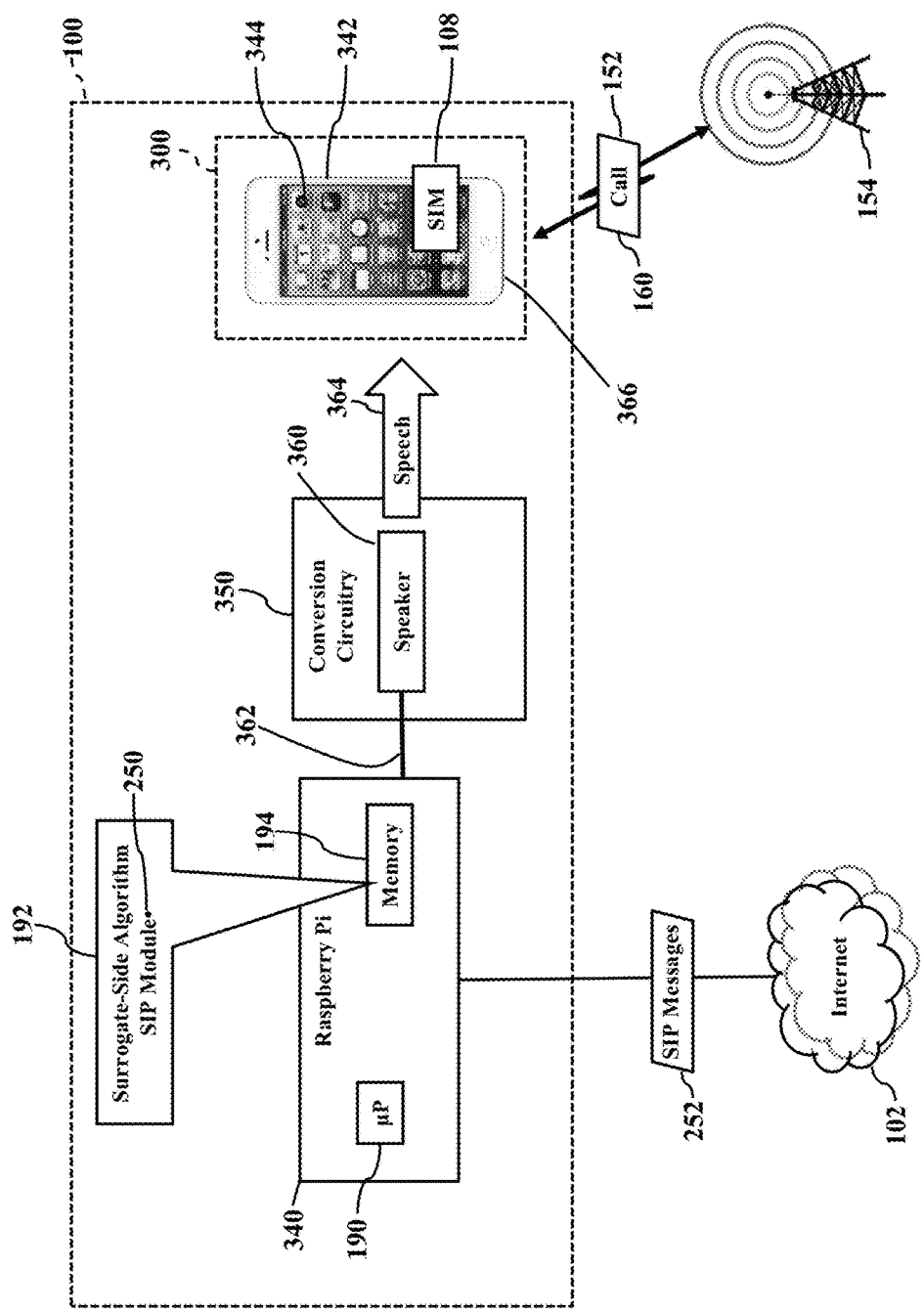

FIGS. 30-32 illustrate a prototype of the surrogate cellular device 100, according to exemplary embodiments. Here the surrogate cellular device 100 was built using the Raspberry Pi computing board 340 and a spare cellphone 342. As the reader may understand, the Raspberry Pi computing board 340 is a commercially-available, low-cost computing system that is used for prototyping and education. The Raspberry Pi computing board 340 thus has the hardware processor 190 that executes the surrogate-side algorithm 192 stored in the local memory device 194. The Raspberry Pi computing board 340, though, currently has no cellular capability. The spare cellphone 342 was thus used to add the functionally of the GSM module 300. The spare cellphone 342 has the subscriber identity module 108, thus allowing the spare cellphone 342 to use its internal cellular transceiver 344 to establish the radio communication 152 with the cellular base station 154.

FIG. 31 illustrates conversion circuitry 350. As the reader should understand, when the spare cellphone 342 receives the cellular call 160, audible speech 352 is output by a cellphone speaker 354 operating in the spare cellphone 342. The conversion circuitry 350 is thus designed to accept the audible speech 352 (output by the spare cellphone 342) as an input to an auxiliary microphone 356 operating in the conversion circuitry 350. The conversion circuitry 350 generates a microphone signal 358 as an audio input to the Raspberry Pi computing board 340. The surrogate-side algorithm 192 thus utilizes the SIP module 250 to convert the microphone signal 358 into the SIP messages 252 for transmission into the public Internet 102.

FIG. 32 further illustrates the conversion circuitry 350. Here the conversion circuitry 350 may include an auxiliary speaker 360. When the Raspberry Pi computing board 340 receives the SIP messages 252 via the public Internet 102, the surrogate-side algorithm 192 converts the SIP messages 252 (perhaps using the SIP module 250) into a speaker signal 362 for the auxiliary speaker 360. The auxiliary speaker 360 thus outputs audible speech 364, which is detected by the microphone 366 operating in the spare cellphone 342. The microphone 366 generates audible signals, which the spare cellphone 342 processes and sends as the cellular call 160 to the cellular base station 154.

Figure 33:
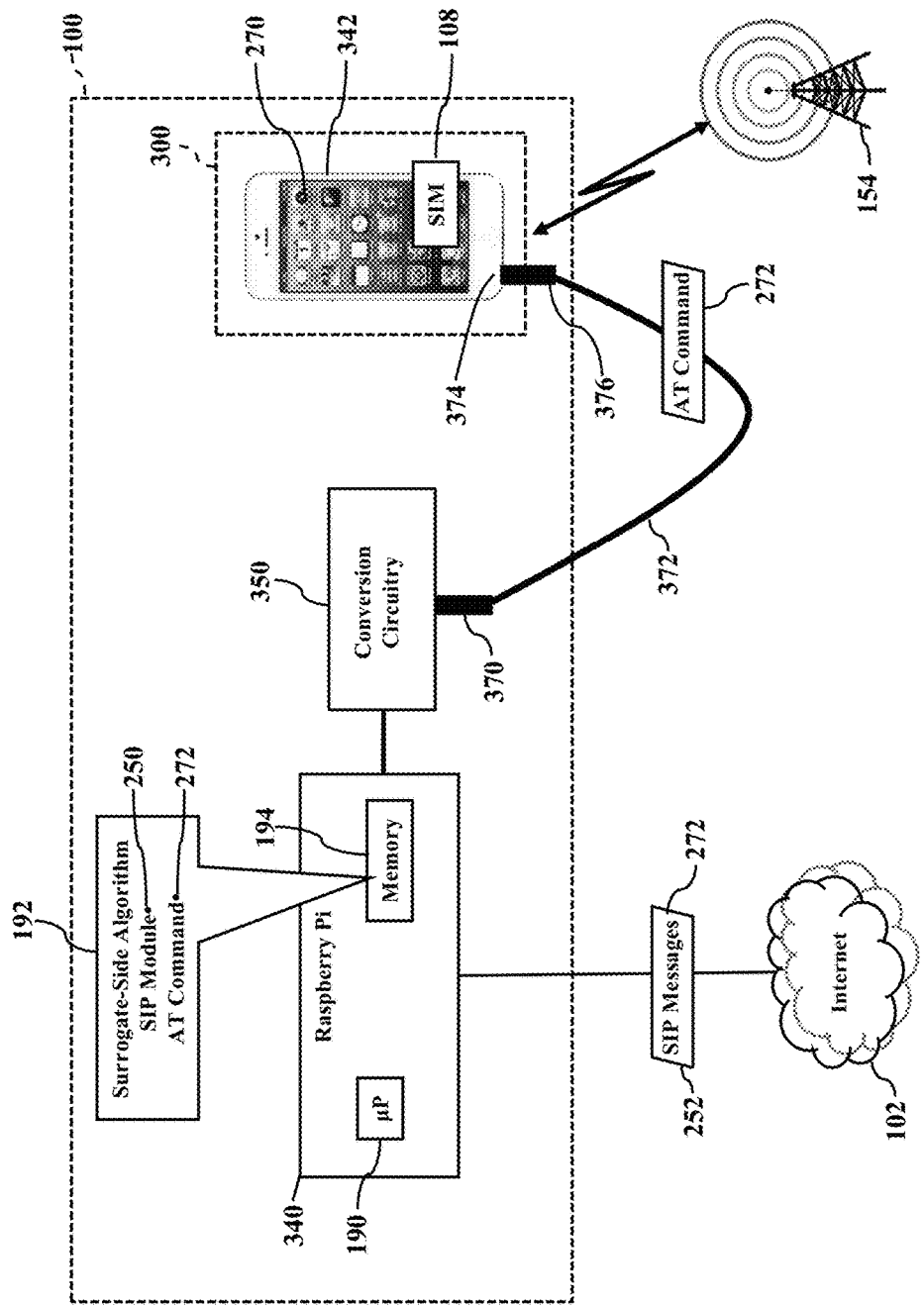

FIG. 33 illustrates the AT command 272. When the Raspberry Pi computing board 340 receives the SIP messages 252 via the public Internet 102, the surrogate-side algorithm 192 instructs the hardware processor 190 to resolve the SIP messages 252 into the AT command 272 (as this disclosure previously explained). However, the AT command 272 must be conveyed from the Raspberry Pi computing board 340 to the modem 270 operating in the spare cellphone 342. The surrogate-side algorithm 192 may thus instruct the hardware processor 190 to send the AT command 272 to an output universal asynchronous receiver/transmitter (or "UART") port 370. The output UART port 370 may thus be used to send the AT command 272 via a data cable 372 to the spare cellphone 342. For example, if the spare cellphone 342 has a headphone jack 374, the data cable 372 may have a male headphone plug 376, thus allowing the spare cellphone 342 to receive the AT command 272. The spare cellphone 342 then executes the AT command 272, as remotely instructed.

Figure 34:
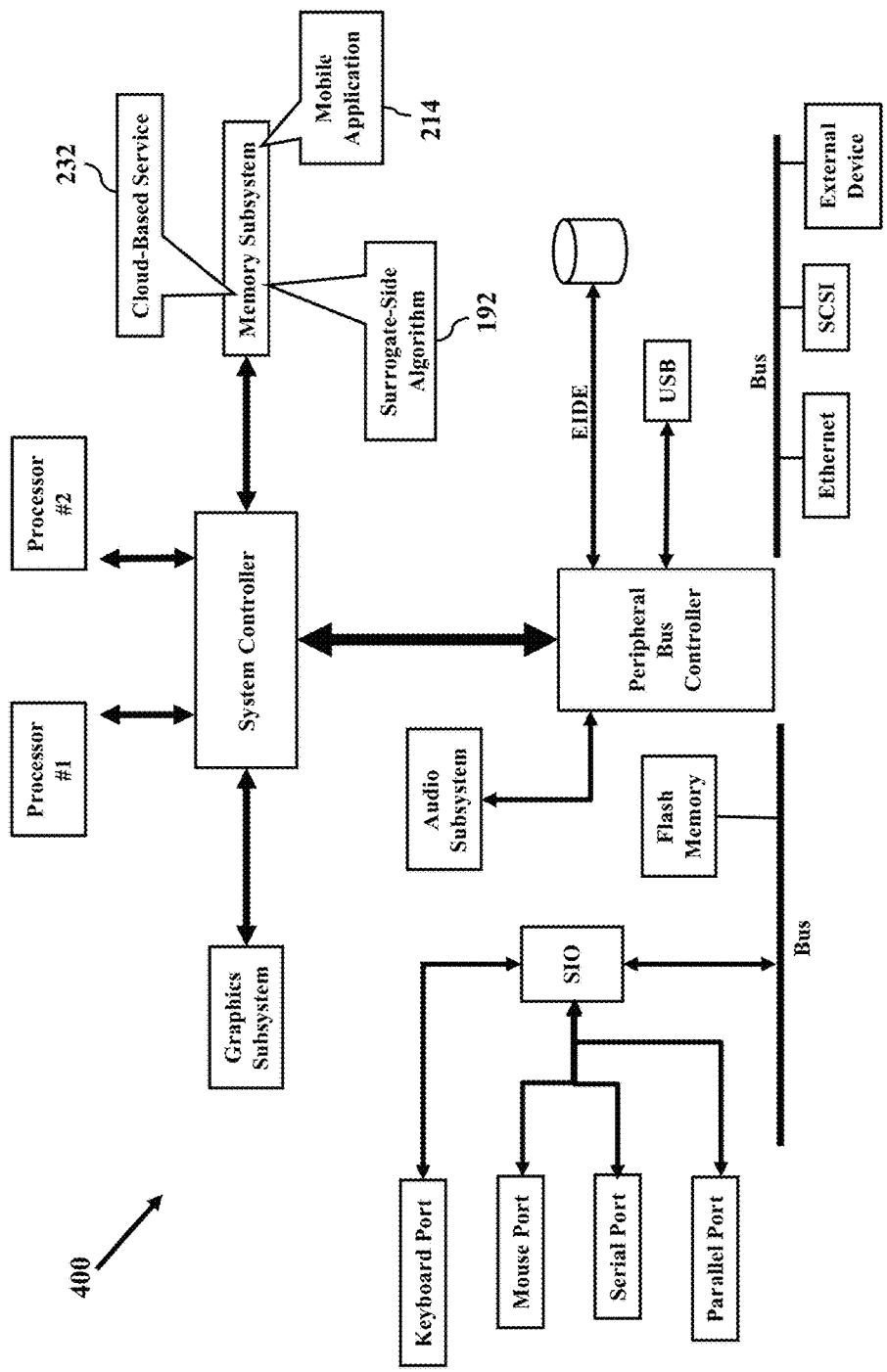

FIG. 34 is a schematic illustrating still more exemplary embodiments. FIG. 34 is a more detailed diagram illustrating a processor-controlled device 400. As earlier paragraphs explained, the surrogate-side algorithm 192, the mobile application 214, and even the cloud-based service 232 may partially or entirely operate in any mobile or stationary processor-controlled device. FIG. 34, then, illustrates the surrogate-side algorithm 192, the mobile application 214, and/or the cloud-based service 232 stored in a memory subsystem of the processor-controlled device 400. One or more processors communicate with the memory subsystem and execute either, some, or all applications. Because the processor-controlled device 400 is well known to those of ordinary skill in the art, no further explanation is needed.

Figure 35:
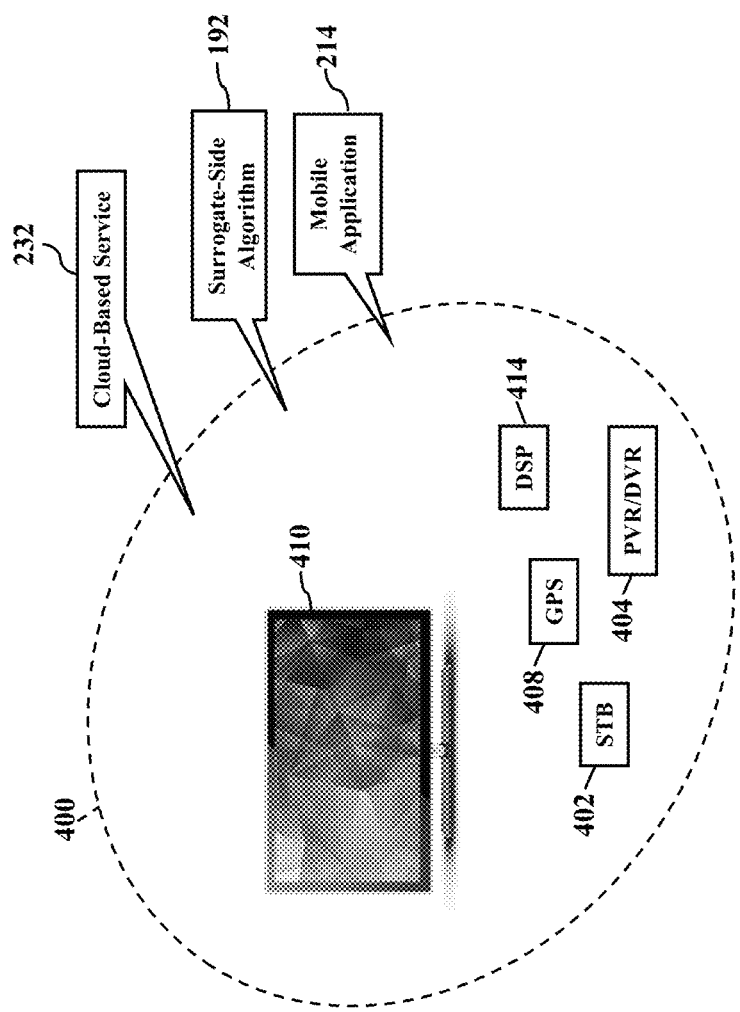

FIG. 35 depicts other possible operating environments for additional aspects of the exemplary embodiments. FIG. 35 illustrates the surrogate-side algorithm 192, the mobile application 214, and/or the cloud-based service 232 operating within various other processor-controlled devices 400. FIG. 35, for example, illustrates that the surrogate-side algorithm 192, the mobile application 214, and/or the cloud-based service 232 may entirely or partially operate within a set-top box ("STB") (402), a personal/digital video recorder (PVR/DVR) 404, a Global Positioning System (GPS) device 408, an interactive television 410, or any computer system, communications device, or processor-controlled device utilizing any of the processors above described and/or a digital signal processor (DSP) 414. Moreover, the processor-controlled device 400 may also include wearable devices (such as watches), radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Figure 36:
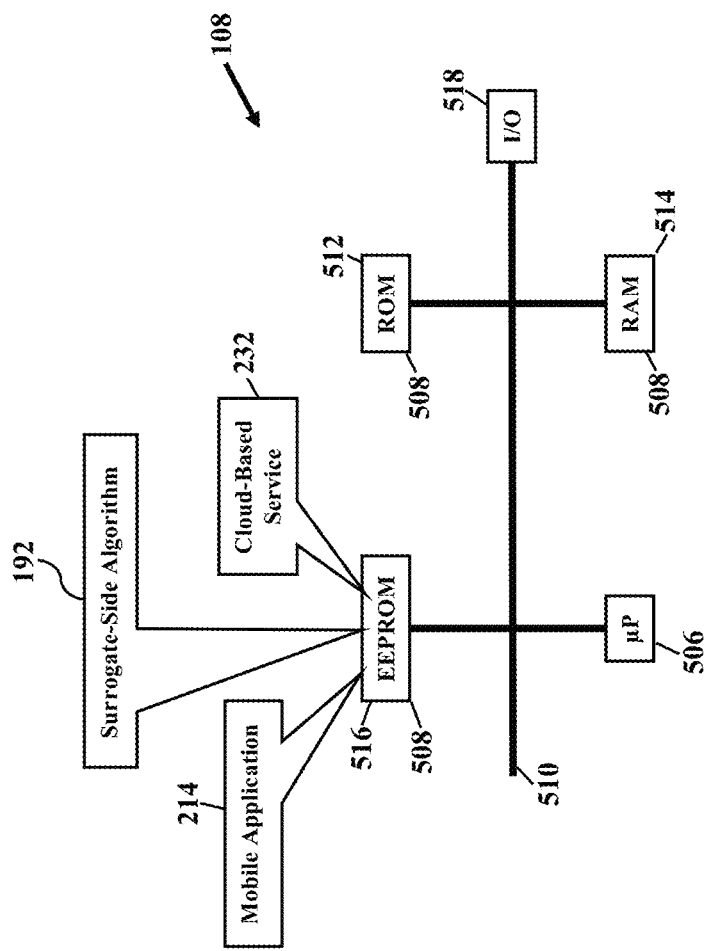
FIGS. 36-38 illustrate still more exemplary operating environments and embodiments.
Figure 37:
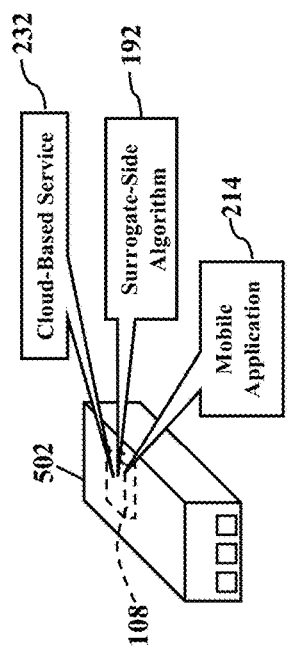
Figure 38:
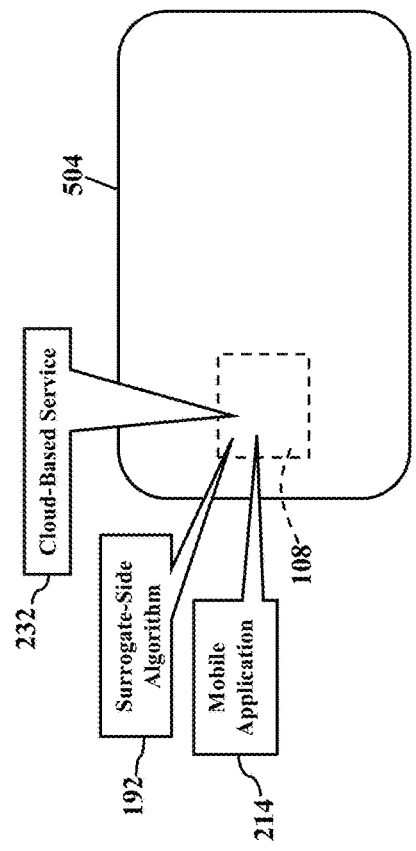

FIGS. 36-38 are schematics further illustrating operating environments for additional aspects of the exemplary embodiments. FIG. 36 is a block diagram of the subscriber identity module 108, while FIGS. 37 and 38 illustrate, respectively, the subscriber identity module 108 embodied in a plug 502 and in a card 504. As those of ordinary skill in the art recognize, the subscriber identity module 108 may be used in conjunction with many communications devices (such as the surrogate cellular device 100 illustrated in FIGS. 1-10). The subscriber identity module 108 stores user information (such as the cellular identifier 110, an International Mobile Subscriber Identity, the user's K, number, and other user information) and any portion of the surrogate-side algorithm 192, the mobile application 214, and/or the cloud-based service 232. As those of ordinary skill in the art also recognize, the plug 502 and the card 504 each may physically or wirelessly interface with the surrogate cellular device 100.

FIG. 36 is a block diagram of the subscriber identity module 108, whether embodied as the plug 502 of FIG. 37 or as the card 504 of FIG. 38. Here the subscriber identity module 108 comprises a microprocessor 506 (μP) communicating with memory modules 508 via a data bus 510. The memory modules 508 may include Read Only Memory (ROM) 512, Random Access Memory (RAM) and/or flash memory 514, and Electrically Erasable-Programmable Read Only Memory (EEPROM) 516. The subscriber identity module 108 stores some or all of the surrogate-side algorithm 192, the mobile application 214, and/or the cloud-based service 232 in one or more of the memory modules 508. FIG. 36 illustrates the surrogate-side algorithm 192, the mobile application 214, and/or the cloud-based service 232 residing in the Erasable-Programmable Read Only Memory 516, yet either module may alternatively or additionally reside in the Read Only Memory 512 and/or the Random Access/Flash Memory 514. An Input/Output module 518 handles communication between the subscriber identity module 108 and the surrogate cellular device 100.

Exemplary embodiments may be applied to any signaling standard. As those of ordinary skill in the art recognize, this disclosure mostly explains the Global System for Mobile (GSM) communications. That is, the surrogate cellular device 100 and the cellular base station 154 (illustrated in FIGS. 5-8) may utilize the Global System for Mobile communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for cellularless roaming, as the above paragraphs explained.

What is claimed is:

1. A method, comprising:
 establishing, by a surrogate cellular device, radio communication with a cellular base station associated with a home location in a private cellular network, the radio communication specifying a cellular identifier associated with a subscriber identity module installed in the surrogate cellular device;
 converting, by the surrogate cellular device, the radio communication into messages utilizing an Internet protocol;
 performing a cloud-based service that provides routing information for cellularless roaming;
 determining an Internet protocol address associated with a SIMless mobile device, the SIMless mobile device having the subscriber identity module removed therefrom and installed in the surrogate cellular device; and
 sending, by the surrogate cellular device, the messages via the public Internet in response to the cloud-based service, the messages sent to the SIMless mobile device associated with the Internet protocol address, the messages providing cellularless roaming outside the home location in the private cellular network.

2. The method of claim 1, further comprising registering the surrogate cellular device with the cellular base station.

3. The method of claim 1, further comprising registering the surrogate cellular device with the private cellular network.

4. The method of claim 1, further comprising using a session initiation protocol to convert the radio communication into the messages utilizing the Internet protocol.

5. The method of claim 1, further comprising:
 querying an electronic database for a network address associated with the surrogate cellular device having the subscriber identity module installed therein; and
 retrieving the Internet protocol address associated with the SIMless mobile device having the subscriber identity module removed therefrom, the Internet protocol address electronically associated with the network address associated with the surrogate cellular device.

6. The method of claim 1, further comprising receiving at least one of a short messaging service text message and a multi-media messaging service message from the cellular base station.

7. The method of claim 1, further comprising receiving a cellular call from the cellular base station.

8. A system, comprising:
a hardware processor; and
a memory device, the memory device storing instructions, the instructions when executed causing the processor to perform operations, the operations comprising:
receiving messages sent via the Internet from a surrogate cellular device, the messages utilizing an Internet protocol and converted from radio communications with a cellular base station associated with a home location in a private cellular network, the messages specifying a cellular identifier associated with a subscriber identity module installed in the surrogate cellular device;
performing a cloud-based service that provides routing information for cellularless roaming, the cloud-based service; determining an Internet protocol address associated with a SIMless mobile device, the SIMless mobile device having the subscriber identity module removed therefrom and installed in the surrogate cellular device; and
sending the messages via the public Internet in response to the cloud-based service, the messages sent to the SIMless mobile device associated with the Internet protocol address, the messages sent for cellularless roaming outside the home location in the private cellular network.

9. The system of claim 8, wherein the operations further comprise registering the surrogate cellular device.

10. The system of claim 8, wherein the operations further comprise registering the SIMless mobile device.

11. The system of claim 8, wherein the operations further comprise receiving the messages formatted according to a session initiation protocol.

12. The system of claim 8, wherein the operations further comprise:
querying an electronic database for the cellular identifier specified in the messages; and
retrieving the Internet protocol address associated with the SIMless mobile device having the subscriber identity module removed therefrom, the Internet protocol address electronically associated with the cellular identifier specified in the messages.

13. The system of claim 8, wherein the operations further comprise receiving the messages converted from at least one of a short messaging service text message and a multi-media messaging service message.

14. The system of claim 8, wherein the operations further comprise receiving the messages converted from a cellular call.

15. A memory device storing instructions that when executed cause a processor to perform operations, the operations comprising:
receiving messages sent via the Internet from a surrogate cellular device, the messages utilizing an Internet protocol and converted from radio communications with a cellular base station associated with a home location in a private cellular network, the messages specifying a cellular identifier associated with a subscriber identity module installed in the surrogate cellular device;
performing a cloud-based service that provides routing information for cellularless roaming, the cloud-based service determining an Internet protocol address associated with a SIMless mobile device, the SIMless mobile device having the subscriber identity module removed therefrom and installed in the surrogate cellular device; and
sending the messages via the public Internet in response to the cloud-based service, the messages sent to the SIMless mobile device associated with the Internet protocol address, the messages allowing the cellularless roaming outside the home location in the private cellular network.

16. The memory device of claim 15, wherein the operations further comprise registering the surrogate cellular device.

17. The memory device of claim 15, wherein the operations further comprise registering the SIMless mobile device.

18. The memory device of claim 15, wherein the operations further comprise receiving the messages formatted according to a session initiation protocol.

19. The memory device of claim 15, wherein the operations further comprise:
querying an electronic database for the cellular identifier specified in the messages; and
retrieving the Internet protocol address associated with the SIMless mobile device having the subscriber identity module removed therefrom, the Internet protocol address electronically associated with the cellular identifier specified in the messages.

20. The system of claim 8, wherein the operations further comprise receiving the messages converted from at least one of a short messaging service text message, a multi-media messaging service message, and a cellular call.

* * * * *